(12) United States Patent
Ueda et al.

(10) Patent No.: US 6,473,221 B2
(45) Date of Patent: Oct. 29, 2002

(54) GALVANO-MIRROR AND METHOD OF MAKING THE SAME

(75) Inventors: Satoshi Ueda; Ippei Sawaki; Yoshihiro Mizuno, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 51 days.

(21) Appl. No.: 09/803,014

(22) Filed: Mar. 12, 2001

(65) Prior Publication Data

US 2002/0051281 A1 May 2, 2002

(30) Foreign Application Priority Data

Nov. 2, 2000 (JP) ........................................ 2000-335544

(51) Int. Cl.⁷ .......................... G02B 26/08; G02B 26/00
(52) U.S. Cl. ........................ 359/298; 359/295; 359/291; 359/290; 359/214; 359/221; 359/224
(58) Field of Search ............................... 359/298, 290, 359/291, 871, 245, 214, 224, 221, 230, 223; 369/118; 310/306, 307; 372/92

(56) References Cited

U.S. PATENT DOCUMENTS

| | | | | |
|---|---|---|---|---|
| 5,661,591 A | * | 8/1997 | Lin et al. ................... | 359/290 |
| 5,737,302 A | | 4/1998 | Kasahara ................... | 369/118 |
| 6,094,294 A | * | 7/2000 | Yokoyama et al. ......... | 359/290 |
| 6,198,565 B1 | * | 3/2001 | Iseki et al. .................. | 359/224 |
| 6,262,827 B1 | * | 7/2001 | Ueda et al. ................. | 359/224 |
| 6,271,955 B1 | * | 8/2001 | Atobe et al. ................ | 359/291 |

FOREIGN PATENT DOCUMENTS

JP        8-211320          8/1996

* cited by examiner

*Primary Examiner*—Loha Ben
(74) *Attorney, Agent, or Firm*—Armstrong, Westerman & Hattori, LLP

(57) ABSTRACT

A method of making a galvano-mirror is provided. It includes the following steps. First, a first material substrate formed with a plurality of mirror plate regions is prepared. The mirror plate regions correspond in arrangement to the mirror plate of the galvano-mirror. Then, a second material substrate formed with a plurality of driver plate regions is prepared. The driver plate regions correspond in arrangement to the driver plate of the galvano-mirror. Then, the first and the second material substrates are attached to each other so that each of the mirror plate regions faces a relevant one of the driver plate regions. Finally, the attached first and second material substrates are divided into individual gaslvano-mirrors.

16 Claims, 25 Drawing Sheets

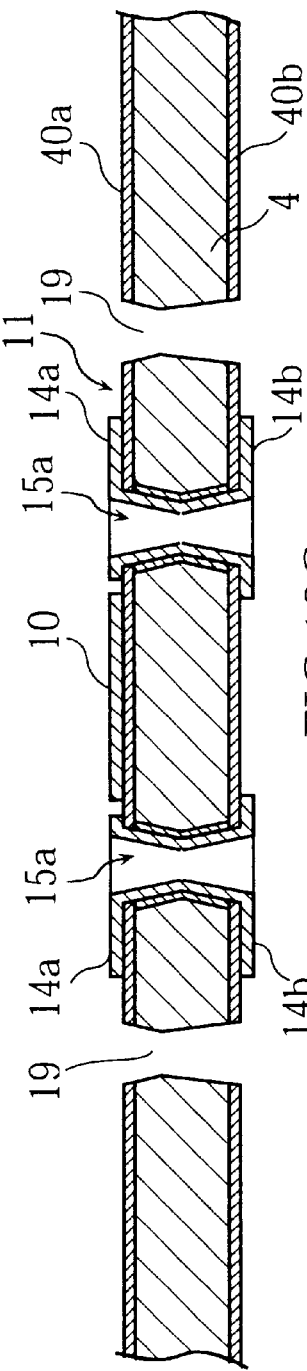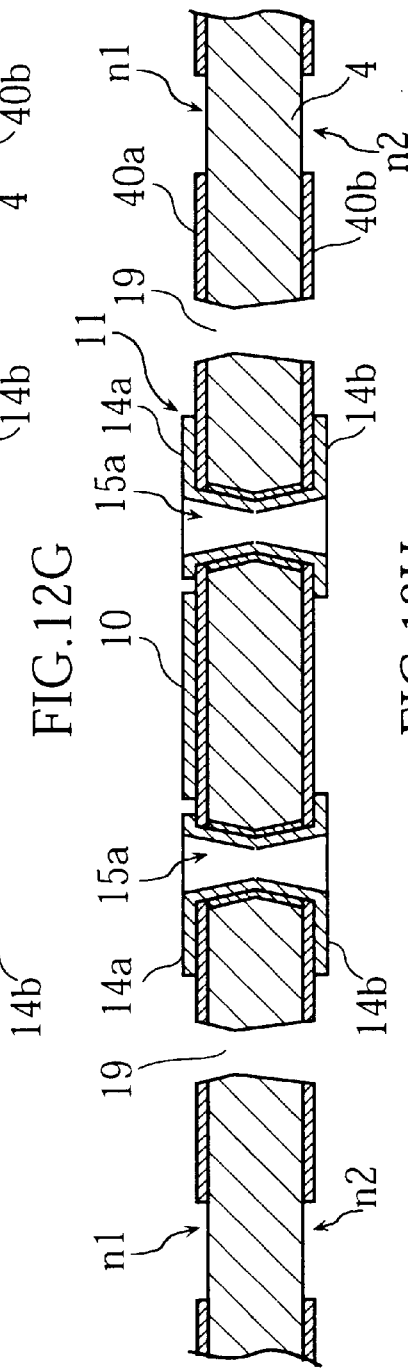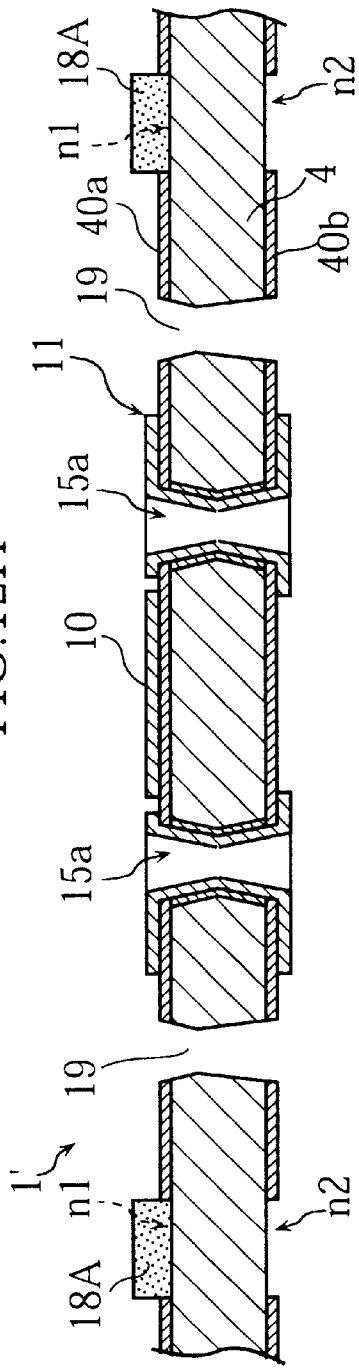

GALVANO-MIRROR AND METHOD OF MAKING THE SAME

BACKGROUND OF THE INVENTION

1. Field of the Invention

The present invention relates to a galvano-mirror used in e.g. an optical disk apparatus for reflecting light in a desired direction. The present invention also relates to a method of making such a galvano-mirror.

2. Description of the Related Art

A conventional galvano-mirror is disclosed in JP-A-8 (1996)-211320, for example. As shown in FIGS. 25A–25B of the accompanying drawings, the conventional galvano-mirror includes a mirror plate 8 and two driver plates 9A–9B. The mirror plate 8 is provided with a pivotable member 81 upon which a mirror 80 is mounted, and with a frame 83 to support the pivotable member 81 via two aligned torsion bars 82. The driver plate 9A is provided with a pair of electrodes 90a, 90b facing the pivotable member 81. Similarly, the other driver plate 9B is provided with a pair of electrodes (not shown) facing the pivotable member 81. For allowing the passage of light traveling to and from the mirror 80, the driver plate 9B is formed with an opening 91.

To rotate the pivotable member 81 in the N1-direction shown in FIG. 25B, the electrode 90a of the plate 9A and the non-illustrated counterpart electrode of the plate 9B are charged to e.g. a negative potential, while the electrodes (not shown) formed on the pivotable member 81 are charged to a positive potential. As a result, an electrical attracting force is generated between the pivotable member 81 and each of the driver plates 9A, 9B, thereby giving rise to the desired rotational movement. To rotate the pivotable member 81 in the opposite direction, the electrode 90b of the plate 9A and the counterpart electrode of the plate 9B are charged to a negative potential. By rotating the pivotable member 81 in this manner, it is possible to control the direction of the light reflected on the mirror 80.

Conventionally, to produce a plurality of galvano-mirrors of the above-described type, the components (such as a mirror plate 8 and driver plates 9A–9B) for one galvano-mirror are prepared separately from the components for another galvano-mirror, and then assembled. In this manner, however, the assembling procedure tends to become complicated, whereby the production efficiency will be unduly lowered. Further, the separate preparation of the components makes it difficult to preparing identical counterpart components of the respective galvano-mirrors.

SUMMARY OF THE INVENTION

The present invention has been proposed under the circumstances descried above. It is, therefore, an object of the present invention to provide a fabrication method enabling efficient production of high-quality galvano-mirrors.

Another object of the present invention is to provide galvano-mirrors made by such a method.

According to a first aspect of the present invention, there is provided a method of making a galvano-mirror which is provided with a mirror plate and at least one driver plate. The mirror plate includes a pivotable member upon which reflecting means and a first electrode are provided, while the driver plate includes a second electrode facing the first electrode. The method includes the steps of: preparing a first material substrate formed with a plurality of mirror plate regions each of which corresponds in arrangement to the mirror plate; preparing a second material substrate formed with a plurality of driver plate regions each of which corresponds in arrangement to the driver plate; attaching the first and the second material substrates so that each of the mirror plate regions faces a relevant one of the driver plate regions; and dividing the attached first and second material substrates into individual galvano-mirrors.

Preferably, each of the first and the second material substrates is a silicon wafer.

In a preferred embodiment of the present invention, the method may further include the steps of preparing a third material substrate provided with a plurality of driver plate regions, and positioning the first material substrate between the second and the third material substrates.

Preferably, the method may further include the steps of forming ribs on at least either one of the first and the second material substrates, and fixing the first and the second material substrates to each other via the ribs. In this case, the ribs may be halved at the step of dividing the attached first and second material substrates.

Preferably, each of the mirror plate regions includes a non-etched flat area in which the reflecting means is provided.

In a preferred embodiment of the present invention, the dividing of the attached first and second material substrates may be performed so that the mirror plate and the driver plate differ in size in each of the individual galvano-mirrors.

Preferably, the method may further include the step of forming a terminal connected to the first electrode in each of the mirror plate regions. In this case, the dividing of the attached first and second material substrates is performed so that the terminal is partially exposed from the driver plate in each of the individual galvano-mirrors. For the partial exposure of the terminal, a predetermined portion of each driver plate region may be etched away.

In a preferred embodiment of the present invention, the method may further include the step of forming a through-hole in at least either one of the first and the second material substrates for electrical connection. In this case, the method may further include the steps of forming a circular projection adjacent to the through-hole in at least either one of the first and the second material substrates, and filling the through-hole with a conductive material.

The method may further include the step of forming ribs on at least either one of the first and the second material substrates for separating the substrate regions from each other.

Preferably, the circular projection and the ribs are formed simultaneously by a thin layer forming technique.

Preferably, the method may further include the step of forming a stopper to prevent the pivotable member from pivoting in each of the mirror plate regions of the first material substrate. The stopper may be removed at the time of dividing the attached first and second material substrates.

According to a second aspect of the present invention, there is provided a galvano-mirror which includes: a mirror plate provided with a pivotable member upon which reflecting means and a first electrode are provided; and at least one driver plate provided with a second electrode facing the first electrode. Advantageously, the mirror plate and the driver plate differ in length from each other.

According to a third aspect of the present invention, there is provided a galvano-mirror which includes: a mirror plate provided with a pivotable member upon which reflecting means and a first electrode are provided; and a driver plate having an inner surface facing the mirror plate and an outer surface opposite to the inner surface. The inner surface is provided with a second electrode facing the first electrode, while the outer surface is provided with a plurality of external connection terminals. Advantageously, the driver plate is formed with a plurality of through-holes for connecting each of the first and the second electrodes to a relevant one of the external connection terminals.

Other features and advantages of the present invention will become apparent from the detailed description given below with reference to the accompanying drawings.

BRIEF DESCRIPTION OF THE DRAWINGS

FIGS. 12A–12H show how the mirror plate wafer is prepared;

DETAILED DESCRIPTION OF THE PREFERRED EMBODIMENTS

The preferred embodiments of the present invention will be described below with reference to the accompanying drawings.

Figure 1:
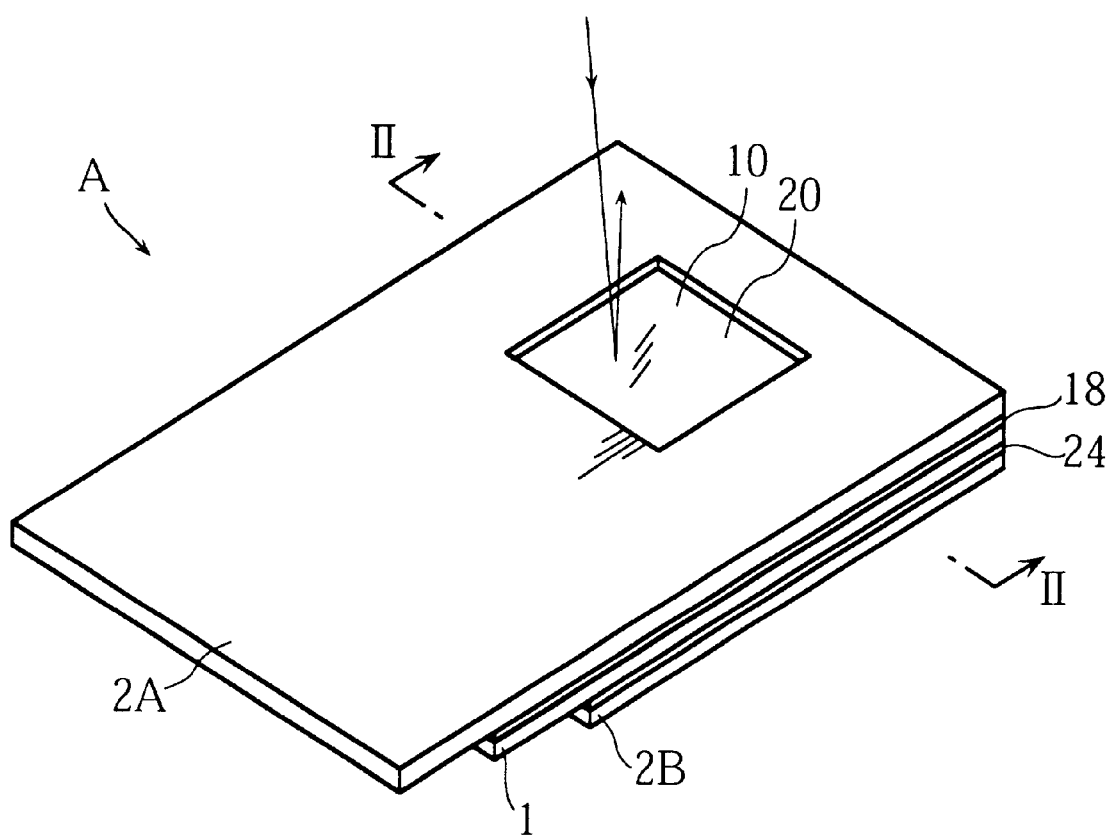
FIG. 1 a perspective view showing a galvano-mirror according to a first embodiment of the present invention.
Figure 2:
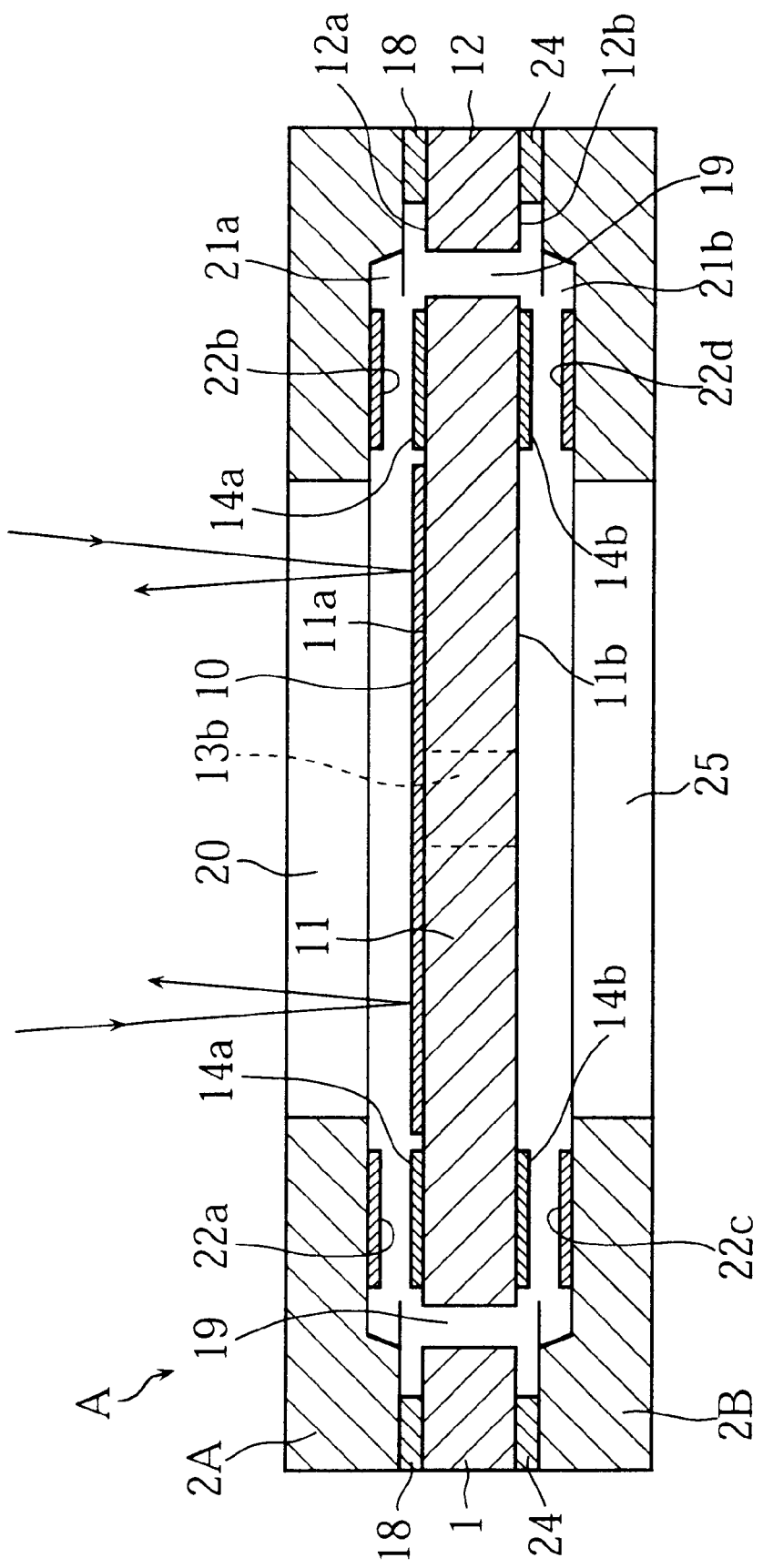
FIG. 2 is a sectional view taken along the lines II—II in FIG. 1.

Reference is first made to FIGS. 1–7 illustrating a galvano-mirror A according to a first embodiment of the present invention. As shown in FIGS. 1 and 2, the galvano-mirror A includes a mirror plate 1, a first driver plate 2A and a second driver plate 2B. The mirror plate 1 is held between the first plate 2A and the second plate 2B.

Figure 4:
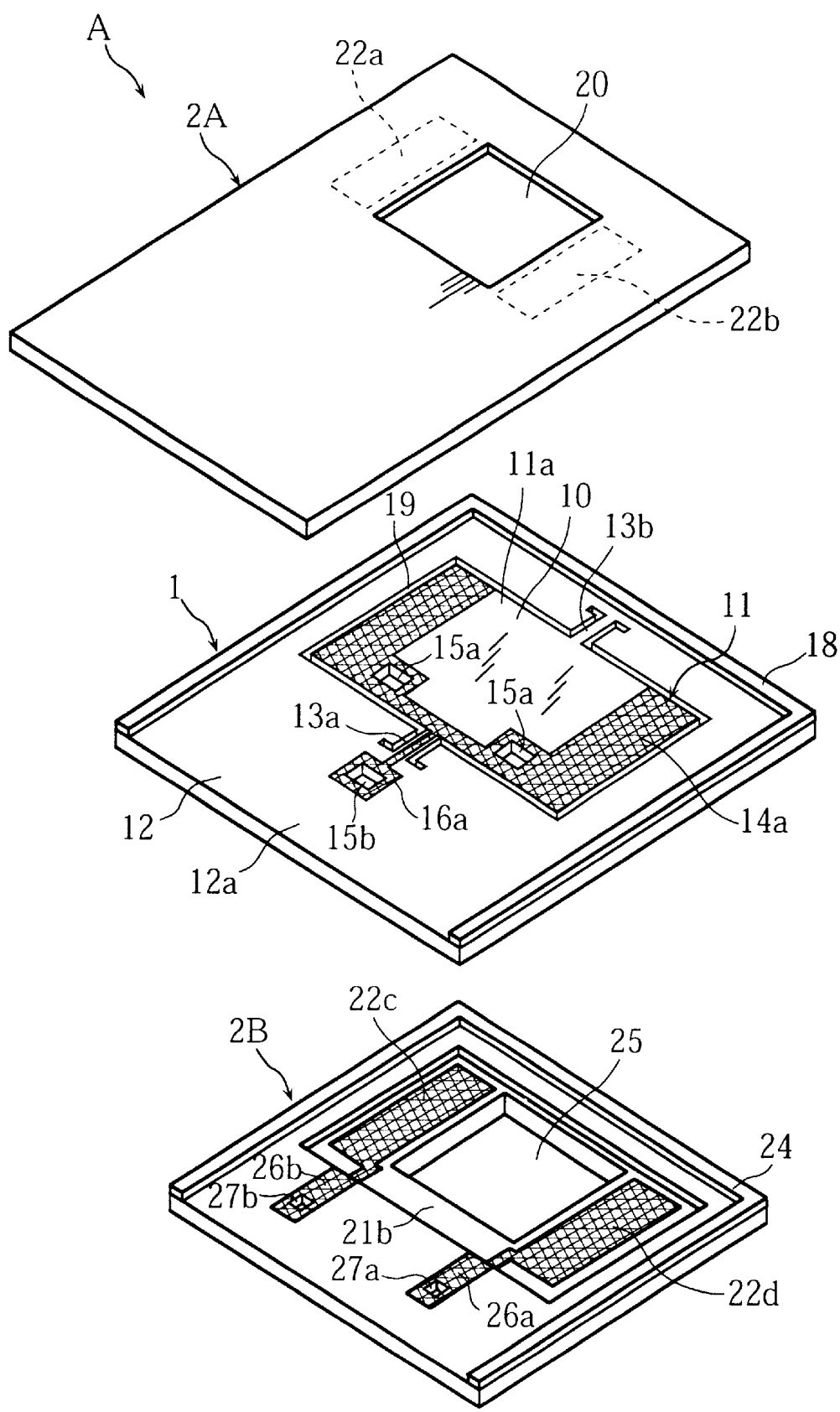
FIG. 4 is an exploded view showing the galvano-mirror of FIG. 1.

As shown in FIG. 4, the mirror plate 1 is formed with a rectangular, pivotable member 11 defined by two symmetrical slits 19. The pivotable member 11 has an obverse surface 11a provided with a mirror 10. The mirror plate 1 is also formed with a frame 12 to support the pivotable member 11 via first and second torsion bars 13a, 13b. The two bars 13a–13b, axially aligned, are disposed opposite to each other across the pivotable member 11.

The mirror 10 may consist of a single or plurality of reflective layers formed on the pivotable member 11. Such a layer may be made of a metal or dielectric material. The latter material is preferable for attaining proper reflection of a laser beam emitted from a blue LED (light-emitting diode).

Figure 6:
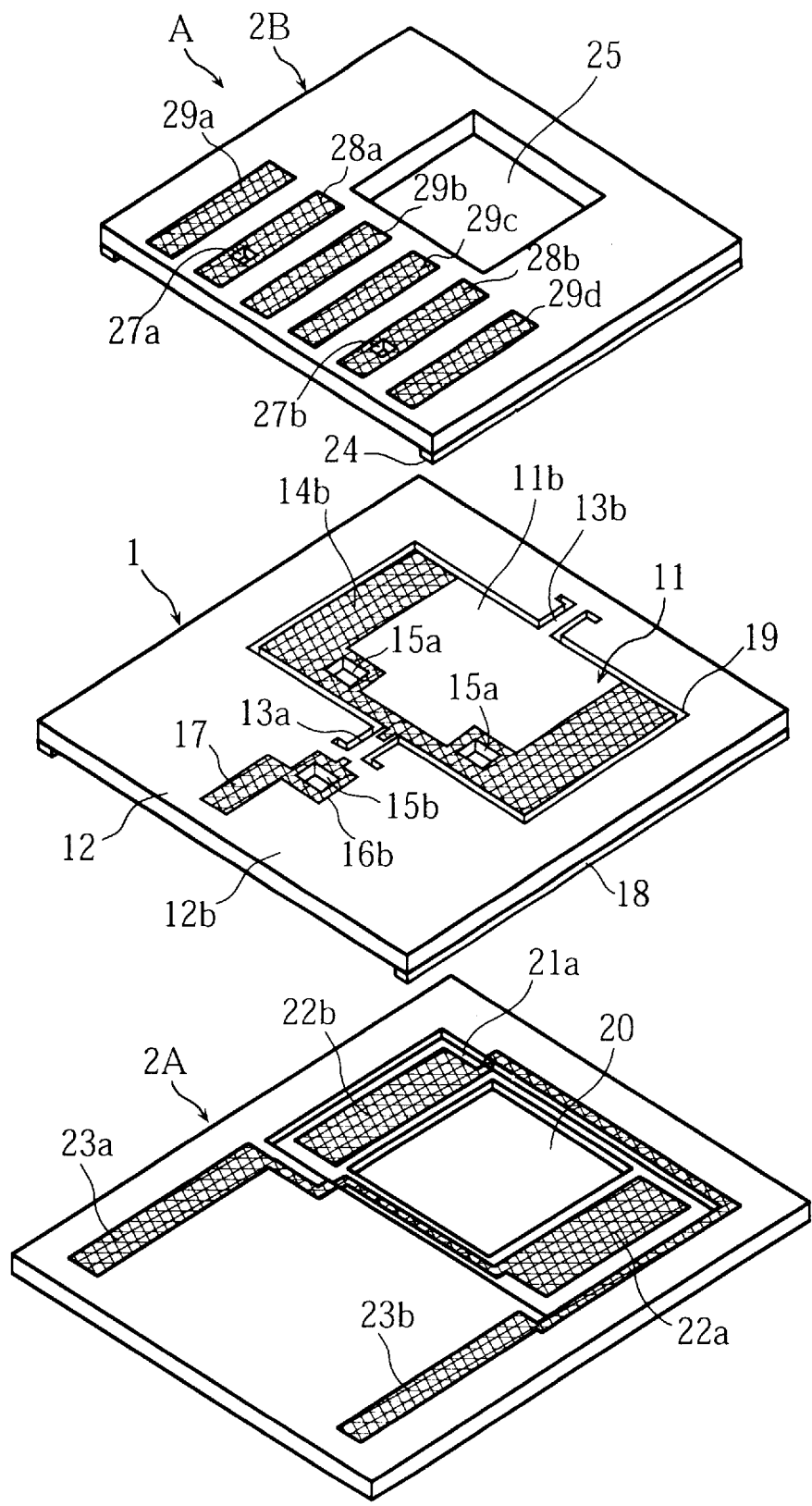
FIG. 6 is an exploded view showing the galvano-mirror of FIG. 1, as seen from the reverse side.

The pivotable member 11 is provided with a first electrode consisting of two parts: an obverse part 14a and a reverse part 14b. The obverse part 14a, as shown in FIG. 4, is formed around the mirror 10 on the obverse surface 11a of the pivotable member 11. The reverse part 14b, as shown in FIG. 6, is formed on the reverse surface 11b of the pivotable member 11. The obverse and the reverse parts 14a, 14b are connected to each other via through-holes 15a formed in the pivotable member 11.

As shown in FIG. 4, the obverse part 14a of the first electrode is connected to a conductive pad 16a formed on the obverse surface 12a of the frame 12. As shown in FIG. 6, a counterpart pad 16b is formed on the reverse surface 12b of the frame 12. These conductive pads 16a, 16b are connected to each other via a through-hole 15b formed in the frame 12. A terminal 17, connected to the pad 16b, extends away from the pivotal member 11.

As shown in FIGS. 2 and 4, a first spacer 18 is provided between the mirror plate 1 and the first driver plate 2A. In the illustrated embodiment, the spacer 18 is originally formed on the mirror plate 1, and the first driver plate 2A is attached to the spacer 18. Alternatively, the spacer 18 may be originally formed on the first plate 2A, instead of the mirror plate 1. Similarly, a second spacer 24 is provided between the mirror plate 1 and the second driver plate 2B. The illustrated spacer 24 is originally formed on the second plate 2B, though it may be formed on the mirror plate 1 instead.

The first driver plate 2A is formed with an opening 20 to expose the mirror 10 to the exterior, as shown in FIG. 1. The first driver plate 2A, as shown in FIGS. 2 and 6, is formed with a recess 21a on its reverse side. In the recess 21a, a second electrode is provided, which includes a first conductive part 22a and a second conductive part 22b. As best shown in FIG. 2, these two parts 22a, 22b are held in a facing relation to the obverse part 14a of the first electrode. As shown in FIG. 6, the first and the second conductive parts 22a–22b are connected to terminals 23a–23b formed on the reverse side of the first driver plate 2A.

As shown in FIG. 4, the second driver plate 2B is formed with a rectangular opening 25 corresponding in position to the pivotable member 11 of the mirror plate 1. The opening 25 prevents the pivotable member 11 from unduly damping in its operation. The second plate 2B is formed, on its obverse side, with a recess 21b in which a third electrode is provided. As shown in the figure, the third electrode includes a first conductive part 22c and a second conductive part 22d.

These two conductive parts are connected to first and second extensions 26a–26b, respectively.

As shown in FIG. 6, the reverse surface of the second driver plate 2B is provided with six terminals 28a–28b and 29a–29d. Of these, the terminals 28a–28b are connected to the first and the second extensions 26a–26b (FIG. 4) via two through-holes 27a–27b formed in the second driver plate 2B.

Figure 5:
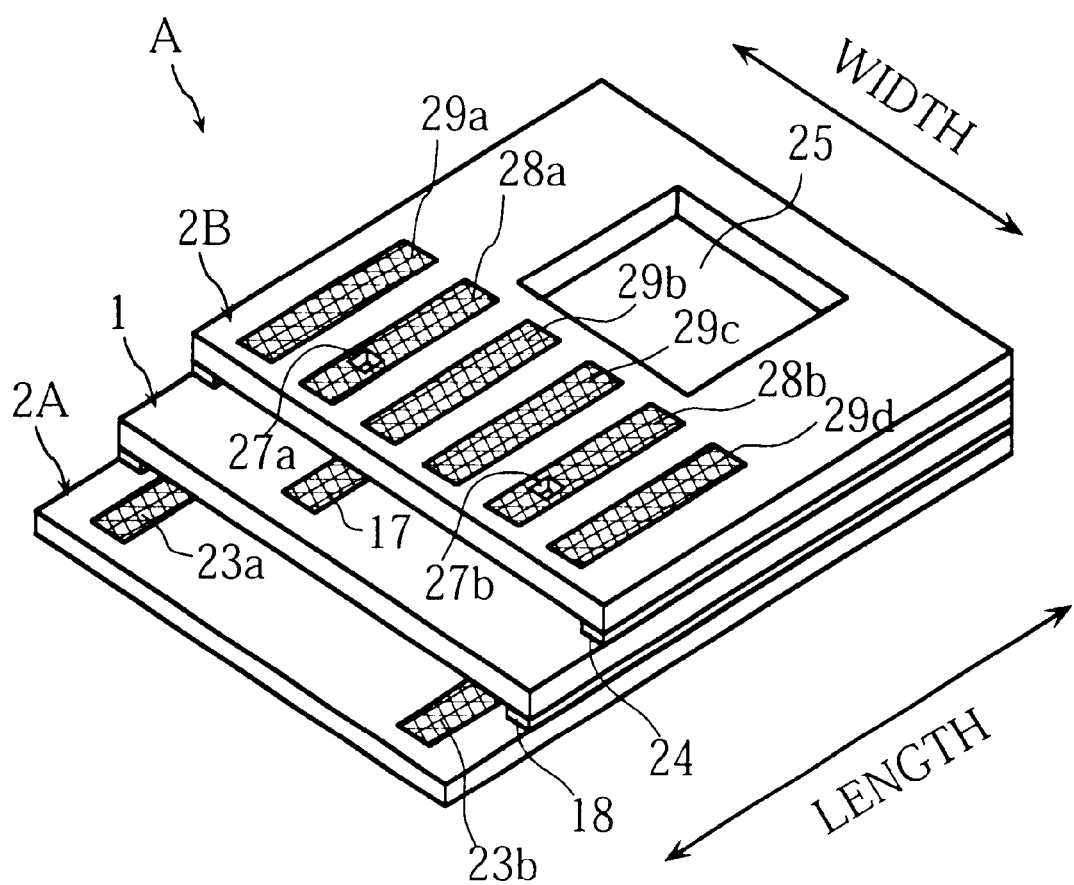
FIG. 5 is a perspective view showing the reverse side of the galvano-mirror of FIG. 1.

Referring to FIG. 5, the mirror plate 1 and the first and the second driver plates 2A, 2B are equal in width but different in length. Specifically, the second plate 2B is the shortest, the mirror plate 1 is the next, and the first plate 2A is the longest. Thus, with one ends held flush with each other, as shown in the figure, the mirror plate 1 projects from the second plate 2B, and the first plate 2A projects from the mirror plate 1. This causes the terminal 17 (on the mirror plate 1) and the terminals 23a–23b (on the first driver plate 2A) to be partially exposed.

Figure 7A:
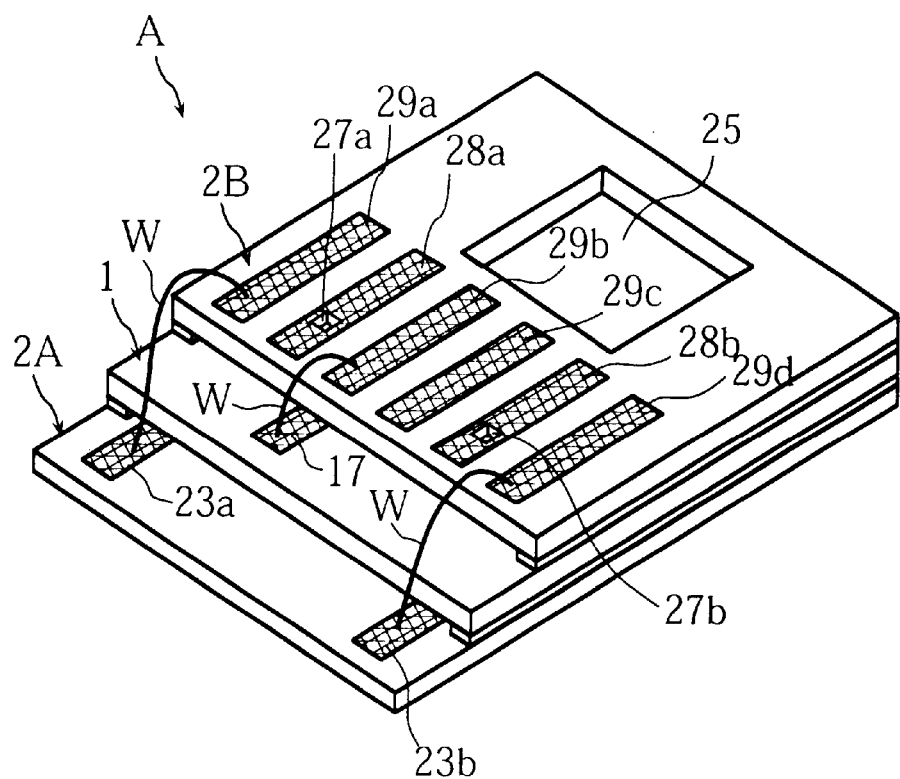
FIG. 7A shows an example of how terminals are connected in the galvano-mirror of FIG. 1.
Figure 7B:
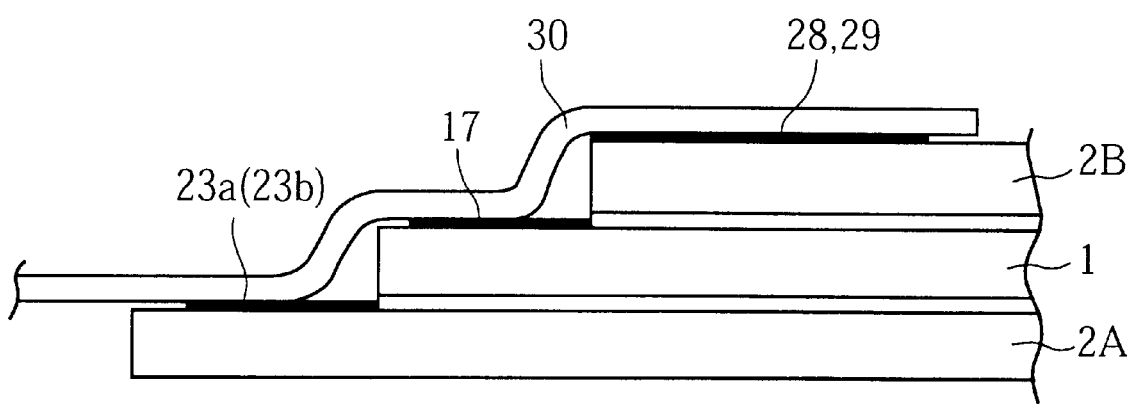
FIG. 7B shows a different example of a terminal-connecting manner.

The exposed parts of the above-mentioned terminals are each connected to one of the six terminals on the second driver plate 2B. Specifically, as shown in FIG. 7A, the terminals 23a, 23b and 17 are connected to the terminals 29a, 29d and 29b, respectively, by conductive wires W. Consequently, the terminal 29b is connected to the first electrode (14a, 14b) of the mirror plate 1 via the terminal 17 (see FIGS. 4 and 6) the terminal 29a is connected to the first part 22a of the second electrode of the first driver plate 2A via the terminal 23a (see FIG. 6), and the terminal 29d is connected to the second part 22b of the second electrode of the first driver plate 2A via the terminal 23b (see FIG. 6). As previously stated, the terminals 28a–28b are connected to the first and the second extensions 26a–26b (see FIG. 4), respectively, via the through-holes 27a–27b of the second driver plate 2B. The remaining terminal 29c may be used for grounding purposes. According to the present invention, use may be made of a flexible cable 30, as shown in FIG. 7B, in place of the connection wires W.

The galvano-mirror A operates in the following manner.

Figure 3:
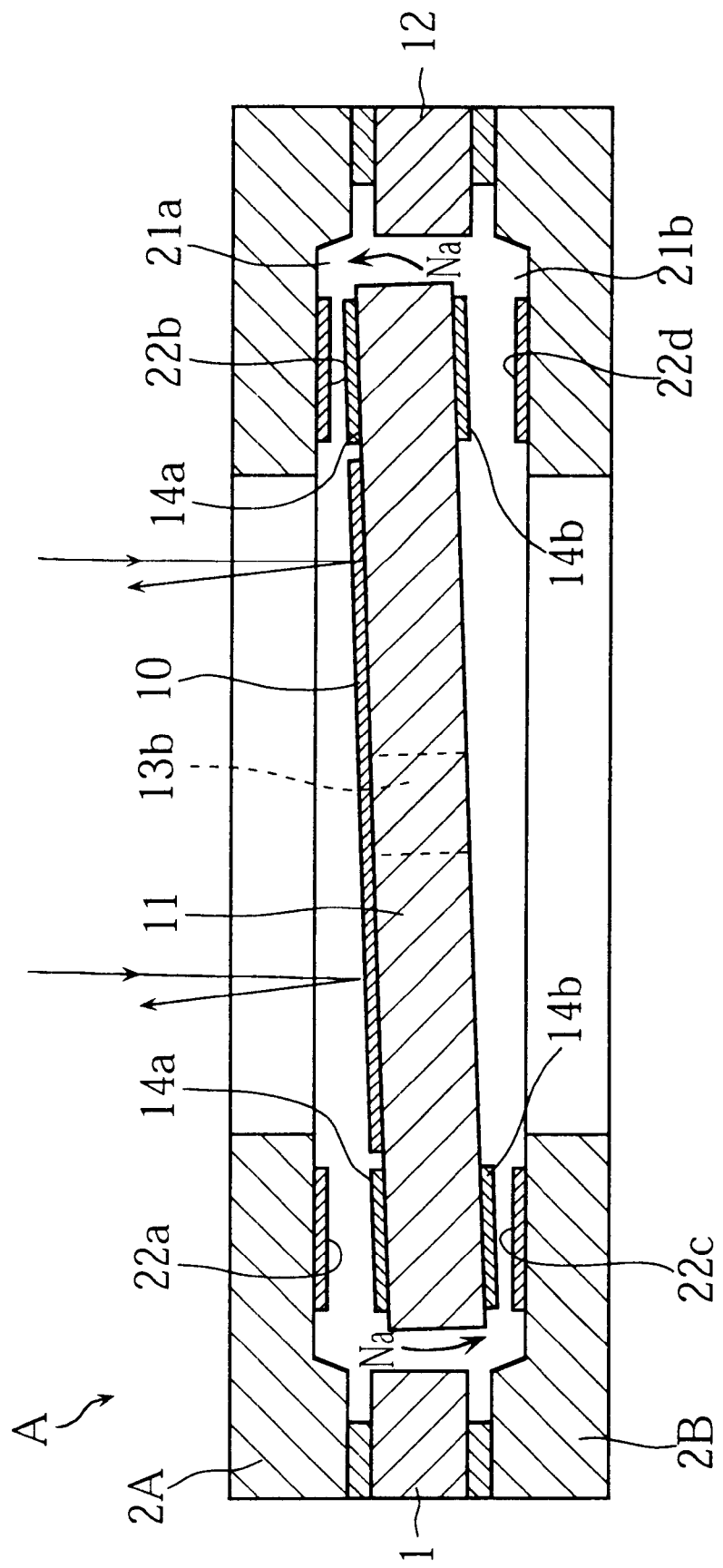
FIG. 3 illustrates how the galvano-mirror operates.

Referring to FIG. 2, to rotate the pivotable member 11, the first electrode (14a, 14b) of the mirror plate 1 may be negatively charged, while the second conductive part 22b of the first driver plate 2A and the first conductive part 22c of the second driver plate 2B are positively charged. Consequently, an attracting force is exerted between the obverse part 14a of the first electrode and the second conductive part 22b of the second electrode, as well as between the reverse part 14b of the first electrode and the first conductive part 22c of the third electrode. Thus, as shown in FIG. 3, the pivotable member 11 is rotated in the Na-direction (counterclockwise) about the axis of the torsion bars 13a, 13b. To rotate the pivotable member 11 in the opposite direction (clockwise in FIG. 3), the first conductive part 22a of the second electrode and the second conductive part 22d of the third electrode are positively charged, in place of the second part 22b and the first part 22c, while the first electrode of the mirror plate 1 is kept to be negatively charged. As readily understood, it is possible to adjust the rotation angle of the pivotable member 11 (hence the mirror 10) by controlling the applied voltage.

Figure 8:
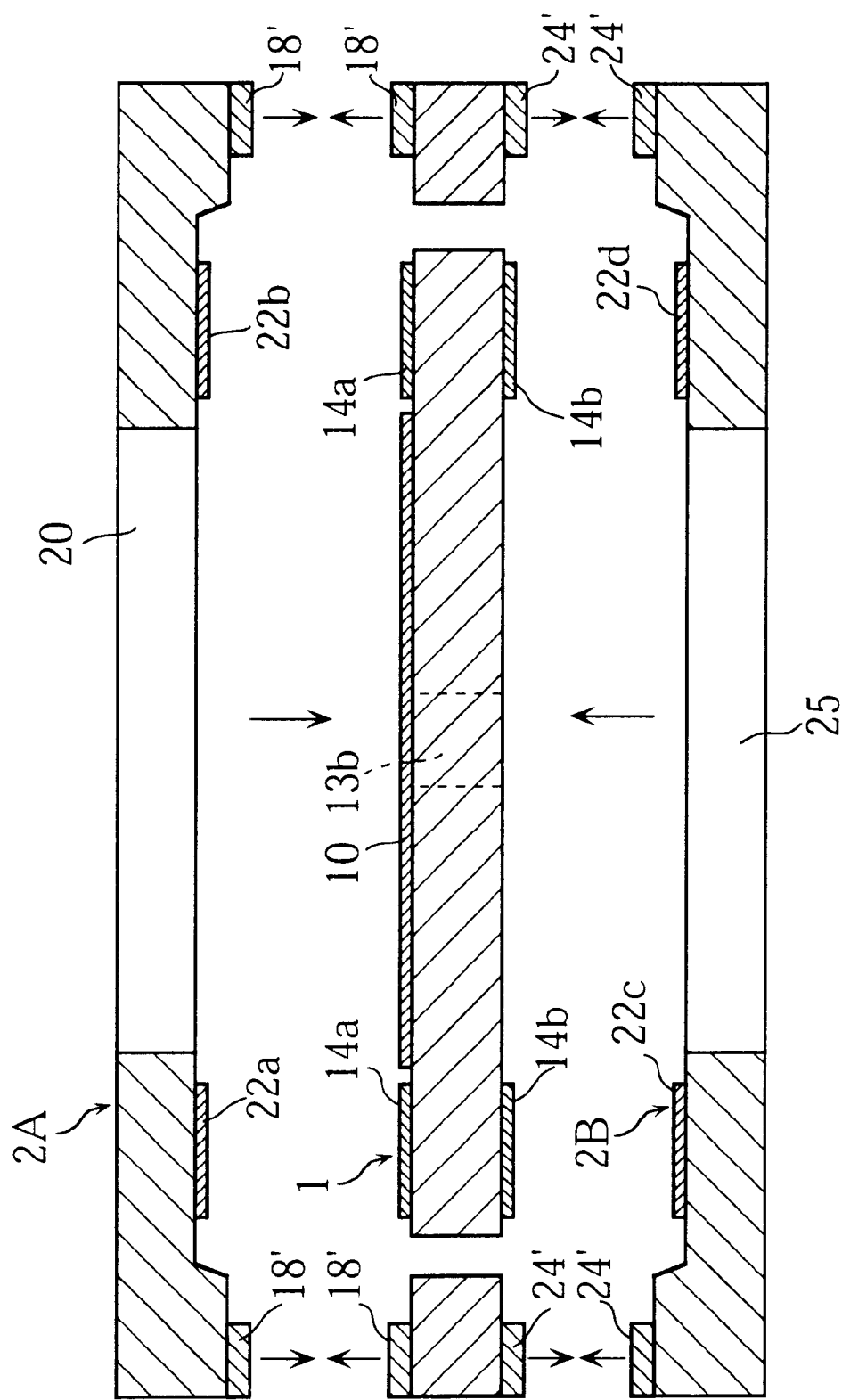
FIG. 8 shows a possible modification made to the galvano-mirror of FIG. 1.

In the above-described embodiment, a single spacer 18 is provided on the mirror plate 1, and another spacer 24 is provided on the second driver plate 2B. The present invention is not limited to this. For instance, as shown in FIG. 8, a pair of spacers 18' may be provided in a facing relation, one on the mirror plate 1 and the other on the first driver plate 2A. In addition, another pair of spacers 24' may also be provided in a facing relation, one on the mirror plate 1 and the other on the second driver plate 2B.

Reference is now made to FIGS. 9–18 illustrating an example of a method of making the above-described galvano-mirror A. As will be understood below, the galvano-mirror A is obtained as one of the identical galvano-mirrors which are collectively fabricated.

Figure 9:
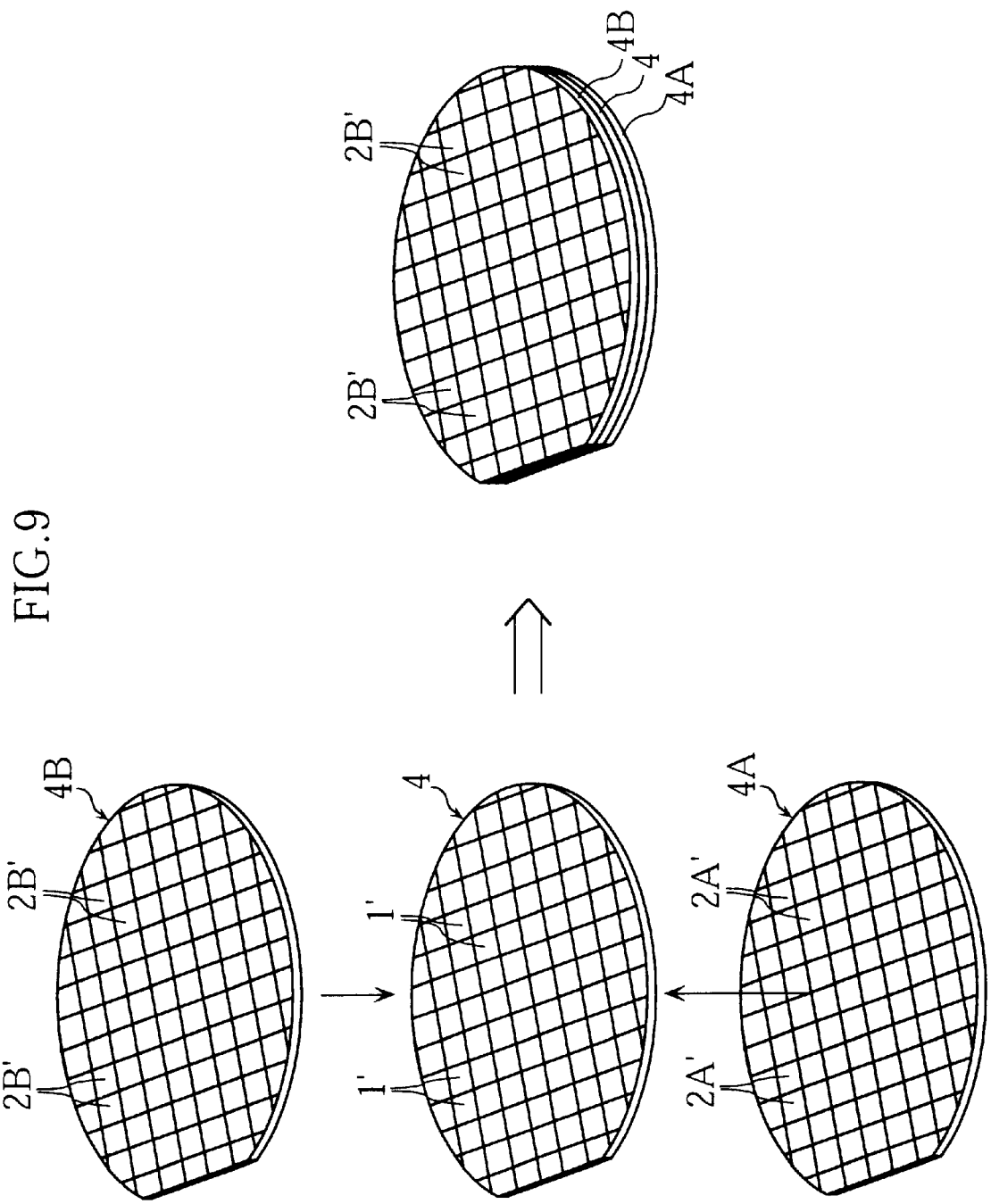
FIG. 9 shows how a first driver wafer (upper), a mirror plate wafer (middle) and a second driver wafer (lower) are assembled to collectively produce a plurality of galvano-mirrors.

For the collective fabrication, three silicon wafers 4, 4A and 4B are prepared, as shown in FIG. 9. The middle wafer 4 is formed beforehand with a plurality of mirror portions 1' corresponding to the mirror plate 1 of the galvano-mirror A. The lower wafer 4A is formed beforehand with a plurality of first driver portions 2A' corresponding to the first driver plate 2A of the galvano-mirror A. The upper wafer 4B is formed beforehand with a plurality of second driver portions 2B' corresponding to the second driver plate 2B of the galvano-mirror A.

Figure 10:
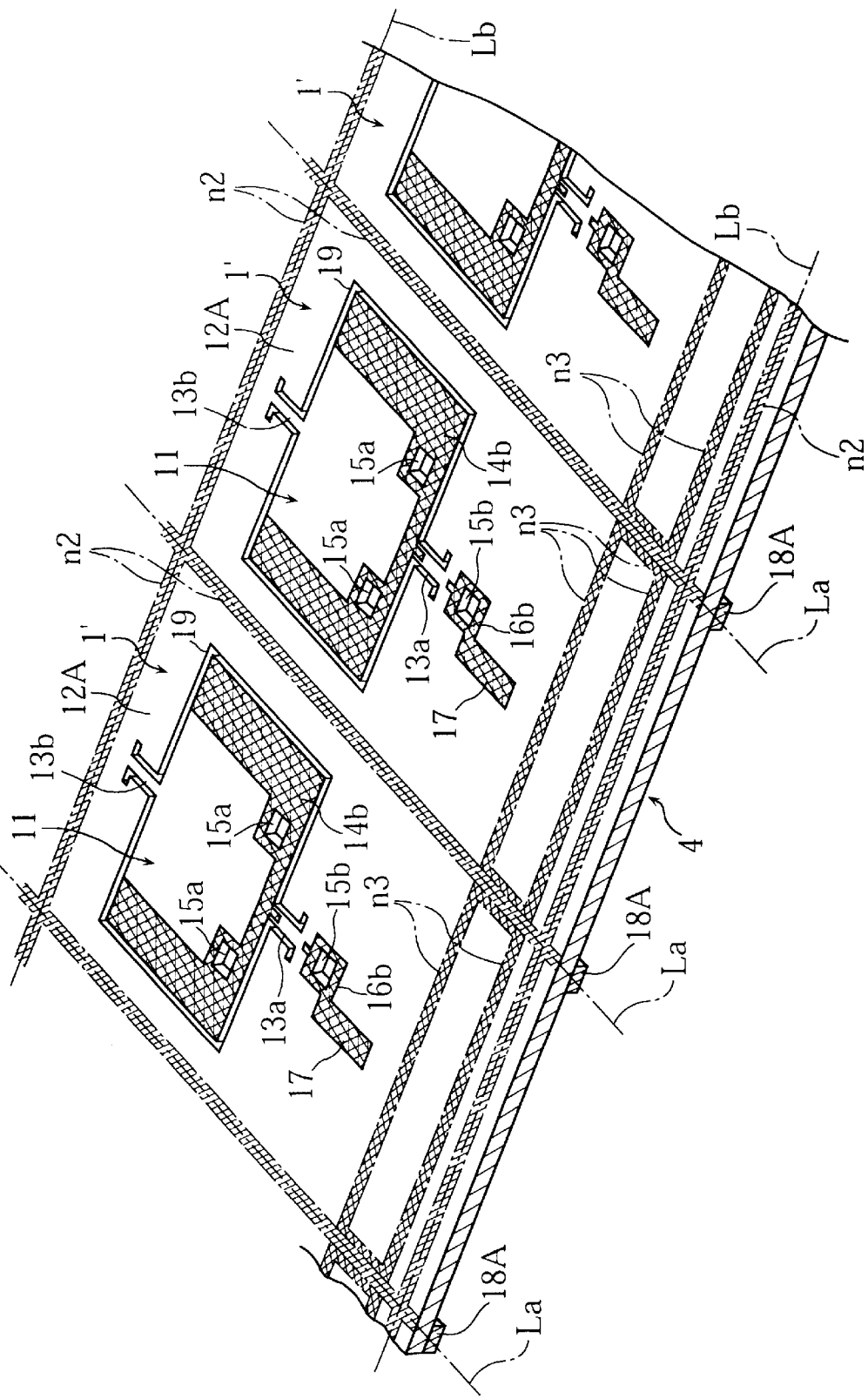
FIG. 10 is an enlarged view showing the reverse side of the mirror plate wafer of FIG. 9.
Figure 11:
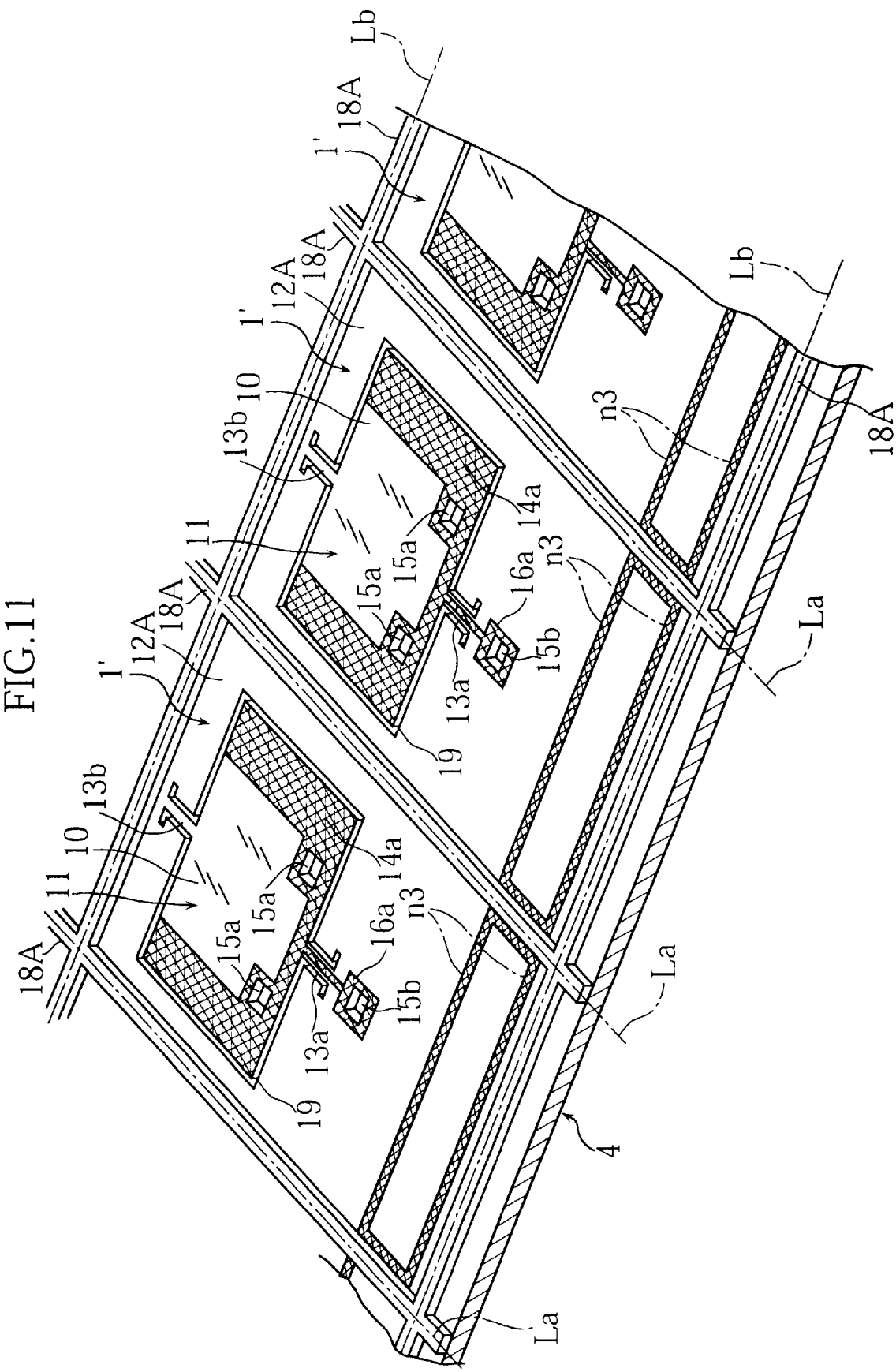
FIG. 11 is an enlarged view showing the obverse side of the mirror plate wafer of FIG. 9.

As shown in FIGS. 10 and 11, each of the mirror portions 1' is a rectangular part of the wafer 4 which is defined by two kinds of parallel imaginary lines La, Lb crossing each other. Each mirror portion 1' includes a pivotable member 11 provided with a mirror 10, and a first electrode (including a first conductive part 14a and a second conductive part 14b) The mirror portion 1' also includes a frame 12A to support the pivotable member 11, and conductive pads 16a, 16b connected to a terminal 17. As shown in FIG. 11, a plurality of ribs 18A are formed on a surface of the middle wafer 4 (the surface facing the lower wafer 4A in FIG. 9) to separate the mirror portions 1' from one another. The ribs 18A correspond to the first spacer 18 of the mirror plate 1. Though not shown in FIGS. 10 and 11, both the surfaces of the wafer 4 are covered with oxide films except for particular areas which will be mentioned later.

The mirror portions 1' may be fabricated in the following manner.

Figure 12A:
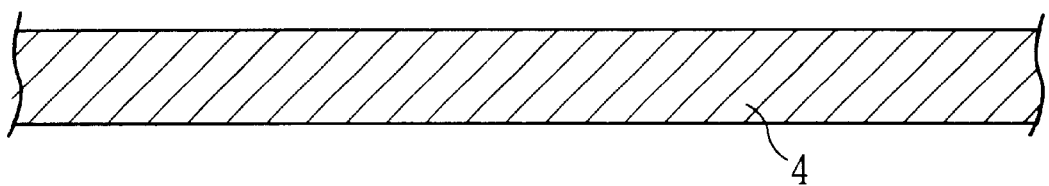
Figure 12B:
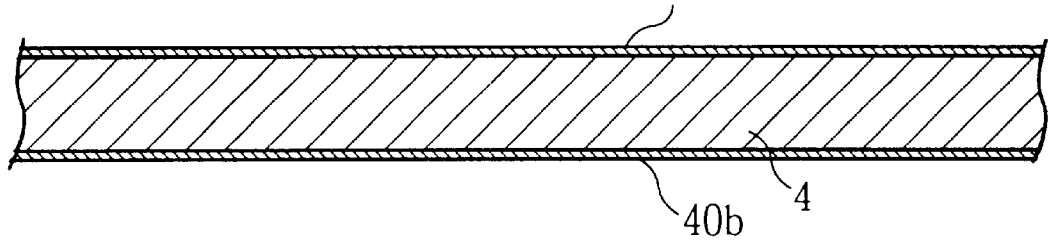

First, as shown in FIGS. 12A–12B, the upper and the lower surface of a silicon wafer 4 are covered with oxide films 40a, 40b formed by thermal oxidation, for example.

Figure 12C:
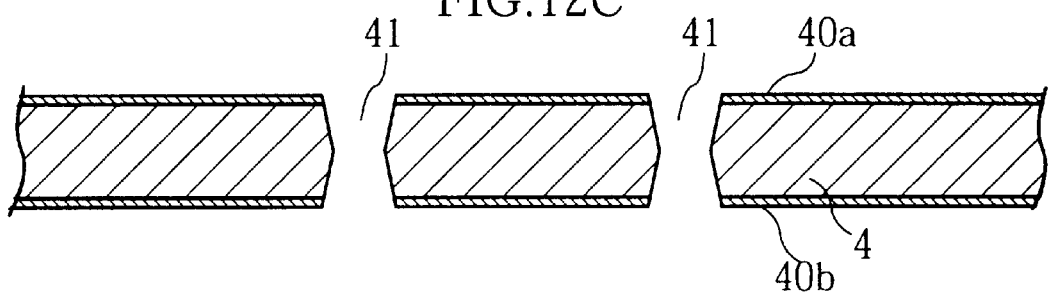

Then, as shown in FIG. 12C, a plurality of through-holes 41 are formed in the wafer 4 by e.g. etching. For the etching purposes, a resist layer is formed on each of the oxide films 40a, 40b by photolithography so that the resulting layer is provided with openings corresponding in position to the through-holes 41. Then, the exposed parts of each oxide layer are etched away. Finally, the silicon wafer 4 is subjected to etching so that the desired through-holes 41 are formed at the locations corresponding to the openings of the resist layer.

Figure 12D:
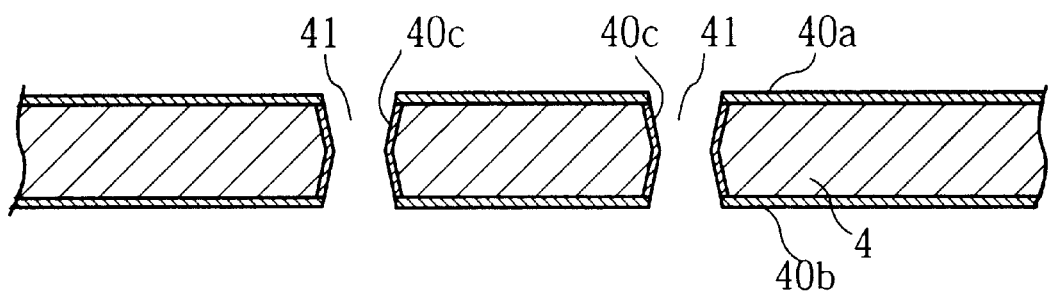

After the through-holes 41 are formed, the wafer 4 is subjected again to thermal oxidation. Thus, as shown in FIG. 12D, the wall surface of each through-hole 41 is covered with an oxide film 40c.

Figure 12E:
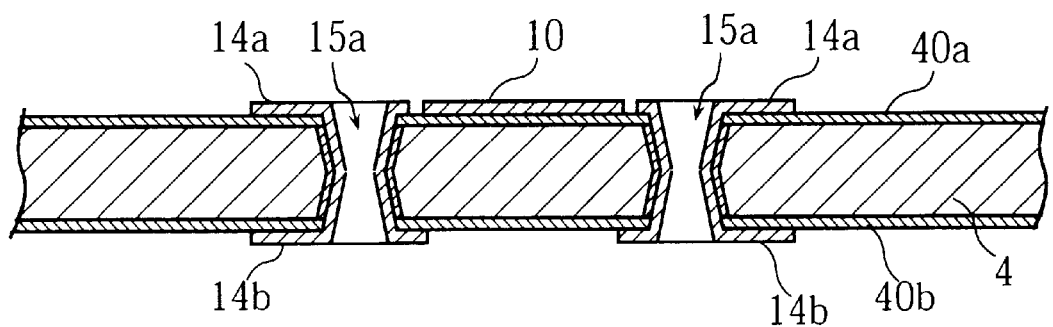

Then, as shown in FIG. 12E, mirrors 10, first conductive parts 14a and second conductive parts 14b are formed on the wafer 4. Though not illustrated, the conductive pads 16a, 16b and the terminals 17 (see FIGS. 10 and 11) are also formed at this stage. These conductive parts, pads and terminals may be made by forming a metal layer on the oxide films 40a–40b (by e.g. sputtering) and then etching the metal layer into the predetermined pattern. In this process, the oxide film 40c at each through-hole 41 is also covered with a metal layer. Thus, the through-holes 15a, 15b as shown in FIG. 10 or 11 are obtained. Preferably, the first and the second conductive parts 14a, 14b and the pads 16a, 16b may be covered with an insulating film.

According to the present invention, the mirror 10 and the conductive parts 14a, 14b may not necessarily be made simultaneously. The through-holes 15a, 15b may be filled with a conductive material for providing excellent conductivity.

Then, as shown in FIG. 12F, a plurality of slits 19 are formed in the wafer 4 to define the pivotable member 11 and the torsion bars 13a, 13b (see FIG. 10 or 11). The slits 19 may be made by the same etching technique as in the case of the through-holes 41 described in reference to FIG. 12C.

Then, as shown in FIG. 12G, the oxide films 40a, 40b are etched away at the locations indicated by signs n1, n2. At this stage, the rectangular loops n3 (see FIGS. 10 and 11) of the oxide films 40a, 40b are also etched away.

Finally, as shown in FIG. 12H, the ribs 18A are formed along the n1-locations by vapor deposition of a suitable material such as polysilicon or glass. To localize the deposition, the oxide film 40a is covered beforehand by a resist layer with openings corresponding to the n1-locations.

Figure 13:
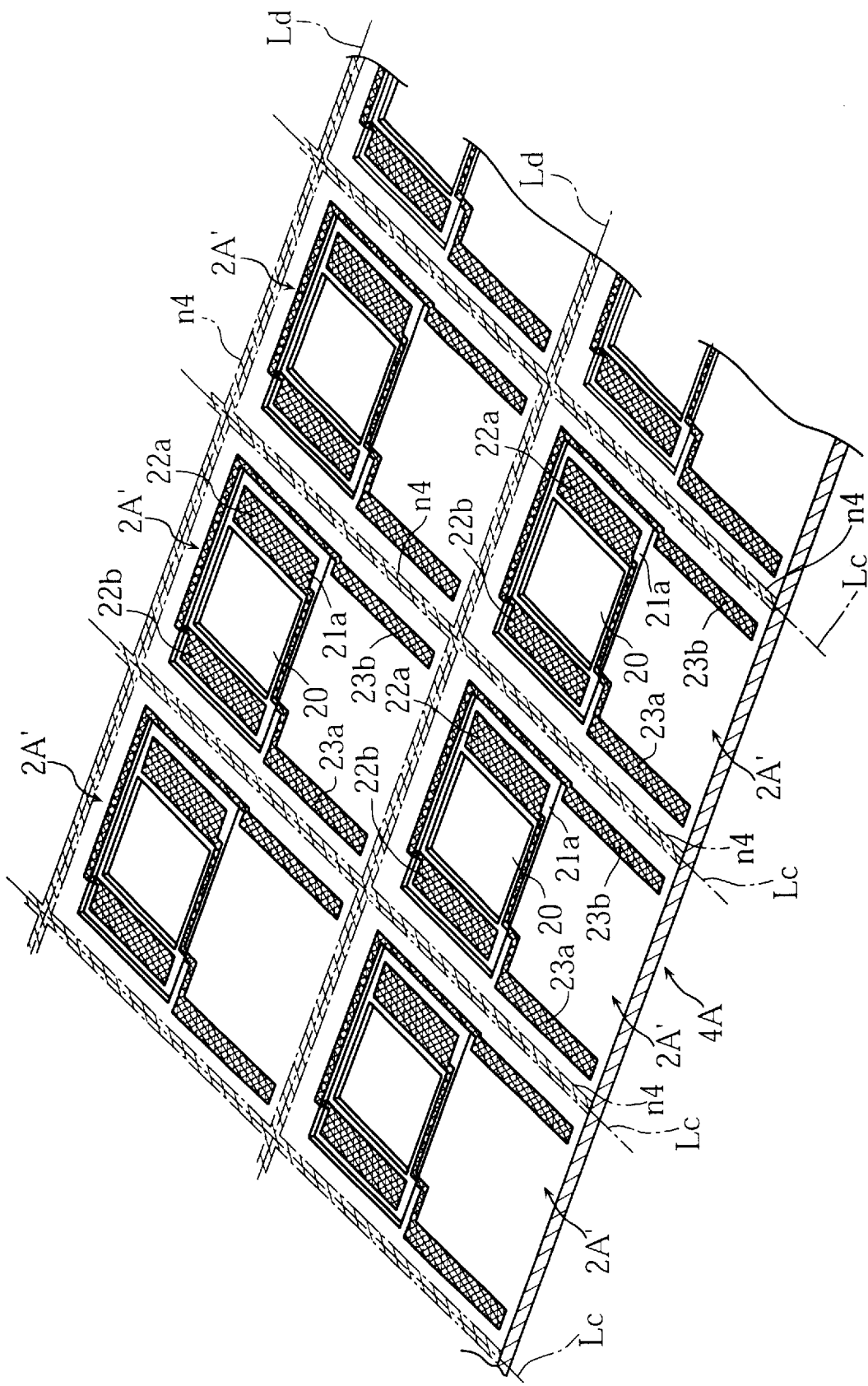
FIG. 13 is an enlarged view showing the reverse side of the first driver wafer of FIG. 9.
Figure 14:
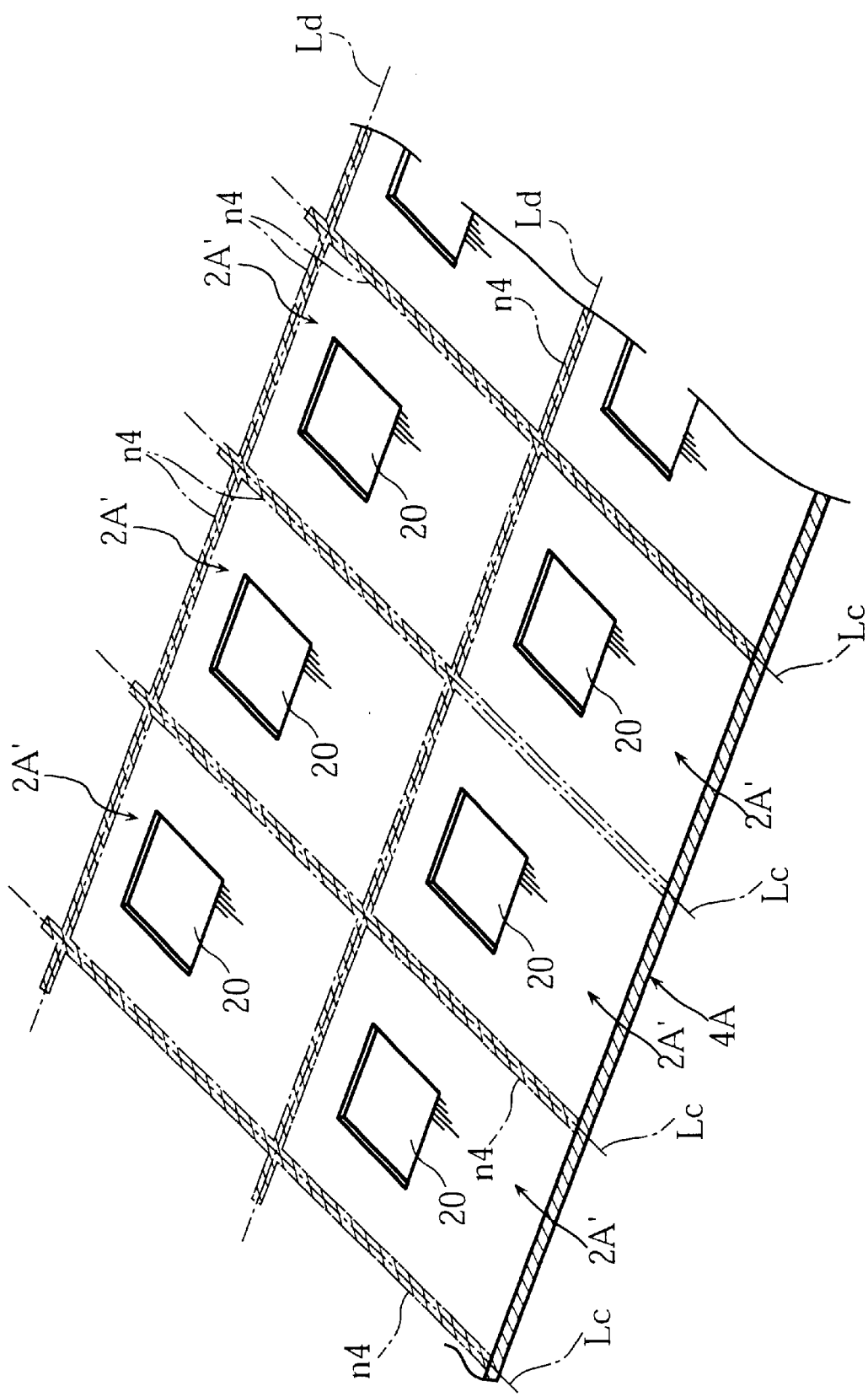
FIG. 14 is an enlarged view showing the obverse side of the first driver wafer of FIG. 9.

Turning now to the first driver wafer 4A, the driver portions 2A' are defined by two kinds of parallel imaginary lines Lc, Ld crossing each other, as shown in FIGS. 13 and 14. The driver portions 2A', which are provided with an opening 20, a third electrode 22a, a fourth electrode 22b and two terminals 23a, 23b, may be fabricated in the following manner.

First, the wafer 4A is formed with a plurality of recesses 21a, with one recess for each driver portion 2A'. Then, both the surfaces of the wafer 4A are covered with oxide films. Then, in each driver portion 2A', a second electrode (including a first conductive part 22a and a second conductive part 22b) and two terminals 23a–23b are formed on the oxide film of one surface of the wafer 4A (see FIG. 13). Then, an opening 20 is formed in each driver portion 2A' by etching, for example. Finally, the oxide films on the wafer 4A are etched away along the grid-like pattern n4 shown in FIGS. 13 and 14.

Figure 15:
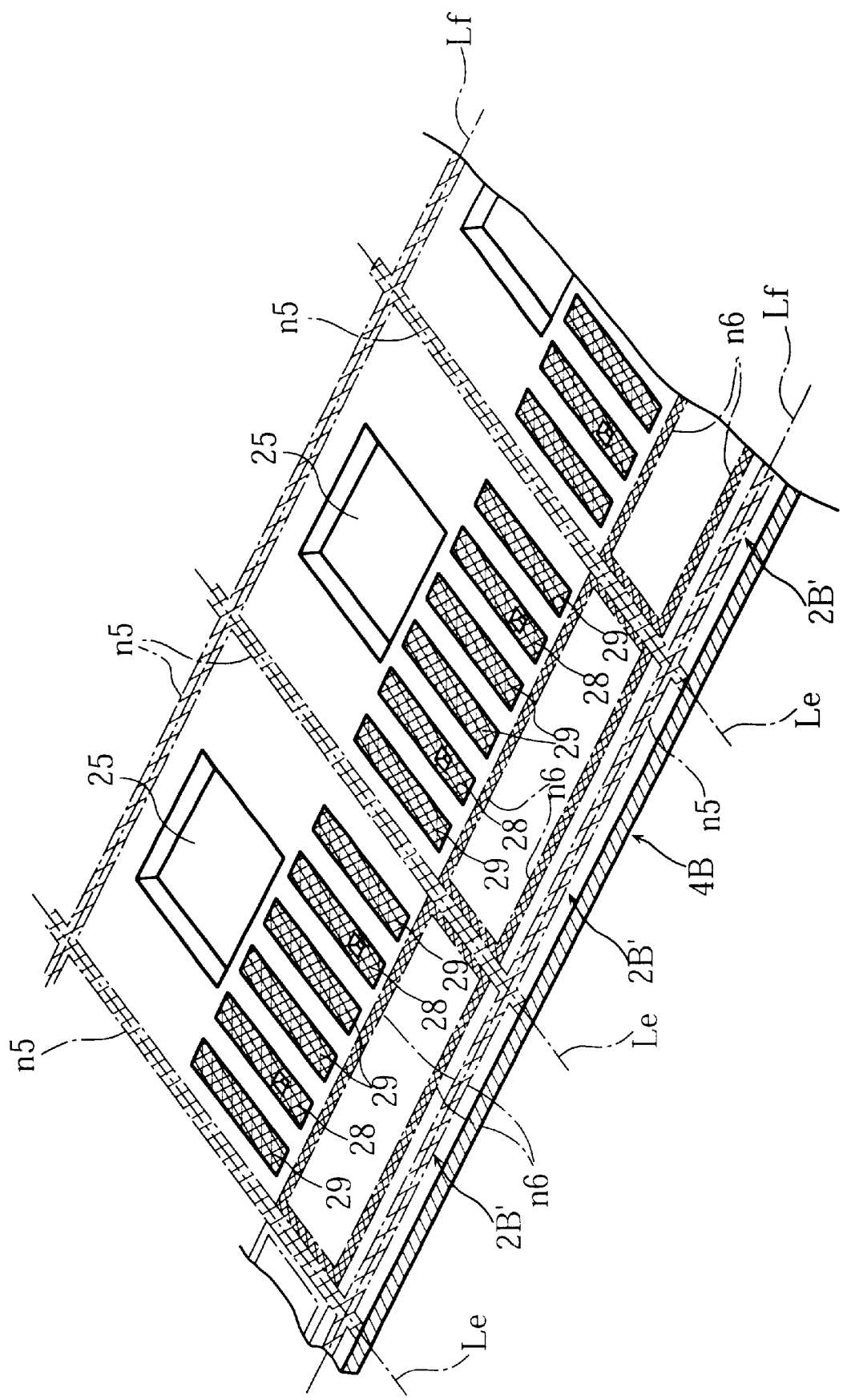
FIG. 15 is an enlarged view showing the reverse side of the second driver wafer of FIG. 9.
Figure 16:
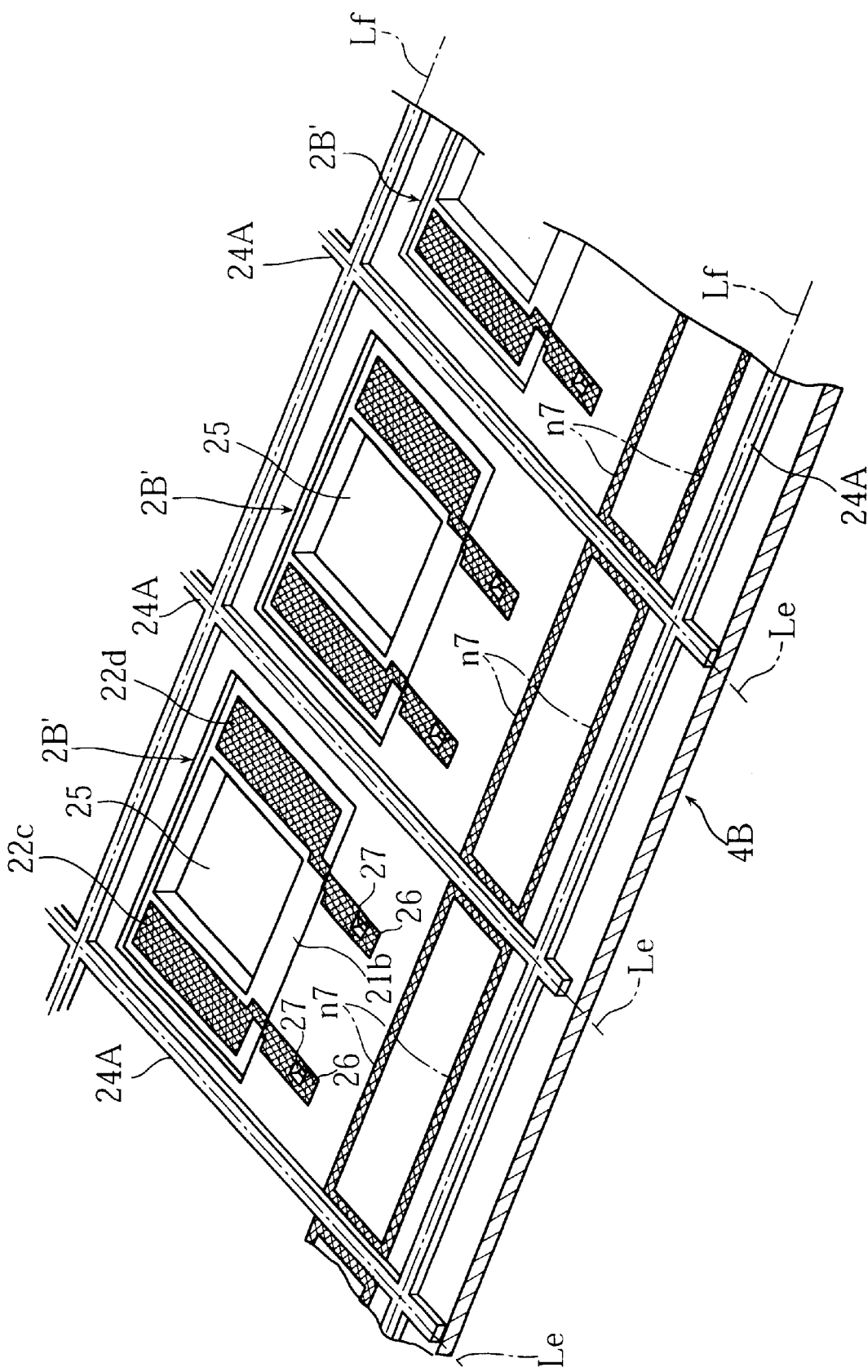
FIG. 16 is an enlarged view showing the obverse side of the second driver wafer of FIG. 9.

In the second driver wafer 4B, as shown in FIGS. 15 and 16, the driver portions 2B' are defined by two kinds of parallel imaginary lines Le, Lf. Each of the driver portion 2B', which is provided with a through-hole 25, a third electrode (including a first conductive part 22c and a second conductive part 22d), a plurality of terminals 28–29, etc, may be fabricated in the following manner.

First, the wafer 4B is formed with a plurality of recesses 21b, with one recess for each driver portion 2B'. Then, both the surfaces of the wafer 4B are covered with oxide films.

Then, in each driver portion 2B', the first and second conductive parts 22c, 22d are formed on the oxide film of one surface of the wafer 4B (see FIG. 16), while six terminals 28–29 are formed on the oxide film of the other surface of the wafer 4B (see FIG. 15). Then, an opening 25 may be formed in each driver portion 2B' by etching. Then, as shown in FIG. 15, the oxide film on one surface of the wafer 2B' is etched away along the grid-like pattern n5 and the rectangular loops n6. Likewise, as shown in FIG. 16, the oxide film on the other surface of the wafer 2B' is etched away along the rectangular loops n7 which correspond to the loops n6. On this side, the wafer 4B is formed with grid-like ribs 24A which may be made by vapor deposition of polysilicon or glass. For causing the ribs 24A to be properly fixed to the wafer 4B, the oxide film on the wafer 4B is etched away beforehand in a grid-like pattern corresponding in position to the ribs 24A.

Figure 17:
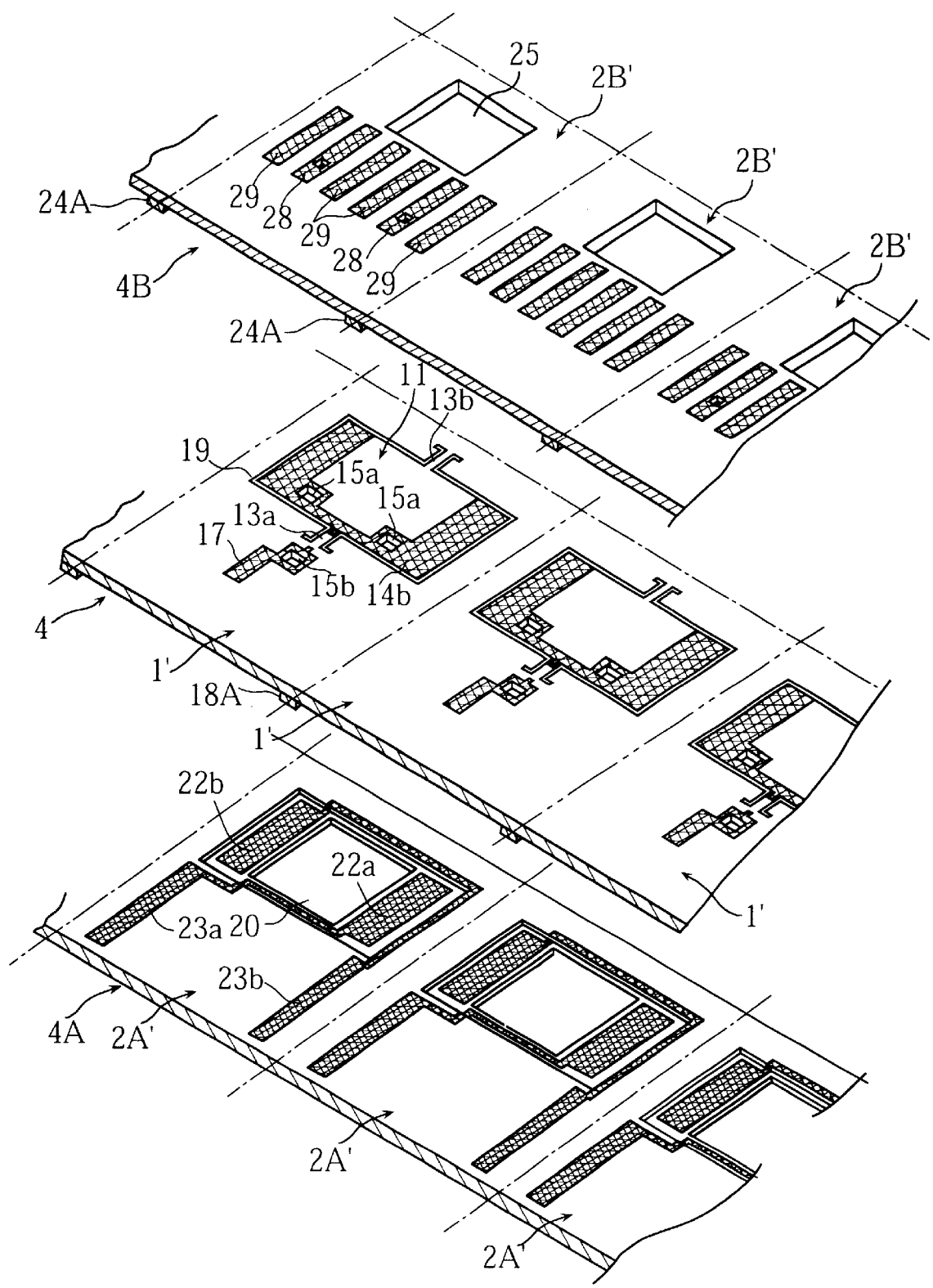
FIG. 17 is an enlarged view showing how the three wafers are stacked.

After the mirror portions 1 and the driver portions 2A' 2B' are built in the wafers 4, 4A and 4B in the above-described manner, these three wafers are fixed to each other, as shown in FIG. 9. Specifically, as shown in FIG. 17, the wafter 4B is fixed to the middle wafer 4 via the ribs 24A, and the middle wafer 4 is fixed to the wafer 4A via the ribs 18A. For this fixing, a conventionally known bonding technique such as anodic bonding or electrostatic bonding may be used. In assembling these wafers, care should be taken to ensure that, as shown in FIG. 17, each mirror portion 1' of the middle wafer 4 is aligned with both a corresponding one of the first driver portions 2A' of the wafer 4A and a corresponding one of the second driver portions 2B' of the wafer 4B.

According to the present invention, instead of providing the ribs 18A on the middle wafer 4, the originally flat wafer 4 may be subjected to etching, thereby being formed with a recess for accommodating a mirror 10. It should be appreciated, however, that the etched recess is less desirable than the ribs 18A since the flatness of the resulting mirror 10 may be compromised due to the relatively rough surface of the recess.

After the three wafers 4, 4A and 4B are bonded to each other, the wafer assembly may be cut in the manner shown in FIGS. 18A–18D. In these figures, the blackened portions on the surfaces of the wafers represent oxide films.

Figure 18A:
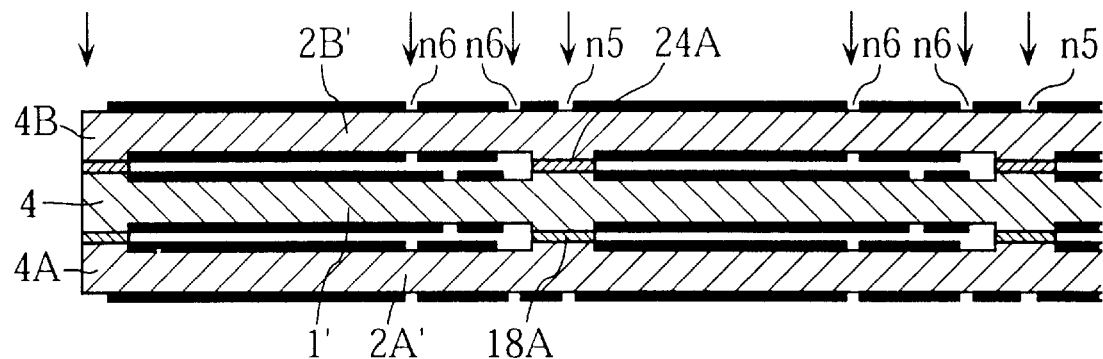
FIGS. 18A–18D show how the assembled wafers are divided.
Figure 18B:
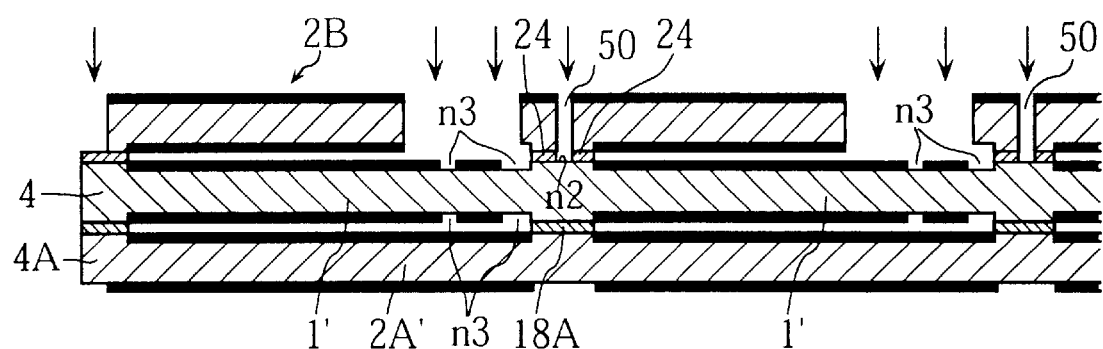

First, as shown in FIG. 18A, the wafer 4B is subjected to anisotropic etching (e.g. reactive ion etching). In this step, the exposed portions n5 and n6 (see also FIG. 15) are etched away in the thickness direction of the wafer assembly. Consequently, as shown in FIG. 18B, a plurality of slits 50 are formed at the n5-locations, where by the wafer 4B is divided into individual driver portions 2B' and the ribs 24 are halved. At the same time, each of the rectangular regions defined by the loops n6 is removed. Thus, parts of the middle wafer 4 (where the terminals 17 extend) are disposed.

Figure 18C:
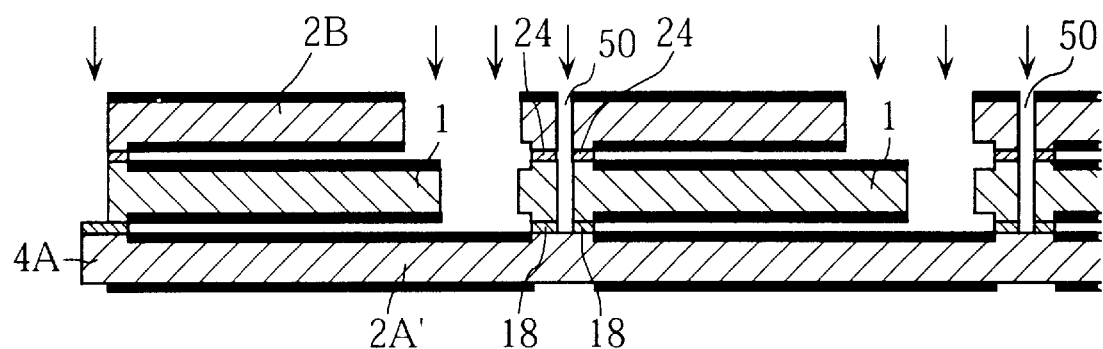

Then, as the etching continues, the exposed portions n2, n3 of the middle wafer 4 are etched away. Thus, as shown in FIG. 18C, the elongated slits 50 halve the ribs 18, while the rectangular regions defined by the loops n3 (see FIGS. 10 and 11) are removed. Consequently, parts of the wafer 4A (where the terminals 23a, 23b extend) are exposed.

Figure 18D:
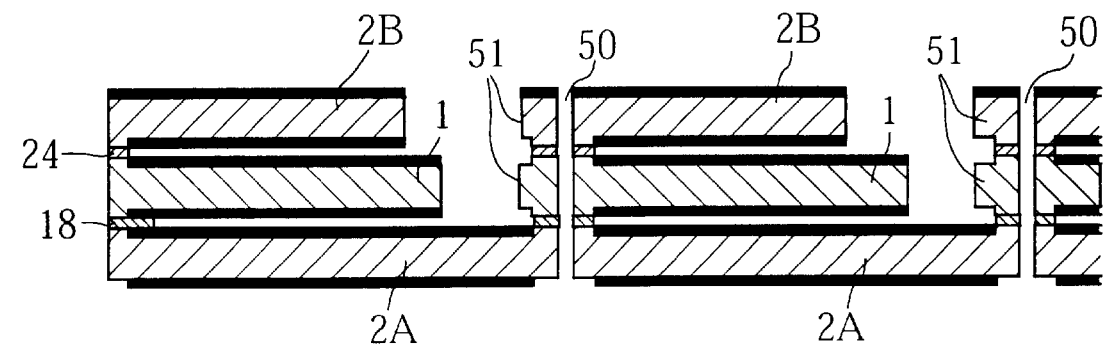

As the etching continues further, the slits 50 becomes much longer, as shown in FIG. 18D, thereby dividing the wafer assembly into individual pieces. Thereafter, the unnecessary portions 51 left on the lowest wafer 2A are removed. Thus, a plurality of identical galvano-mirrors as shown in FIGS. 1–6 are obtained collectively, which is advantageous to improving the production efficiency.

Figure 19:
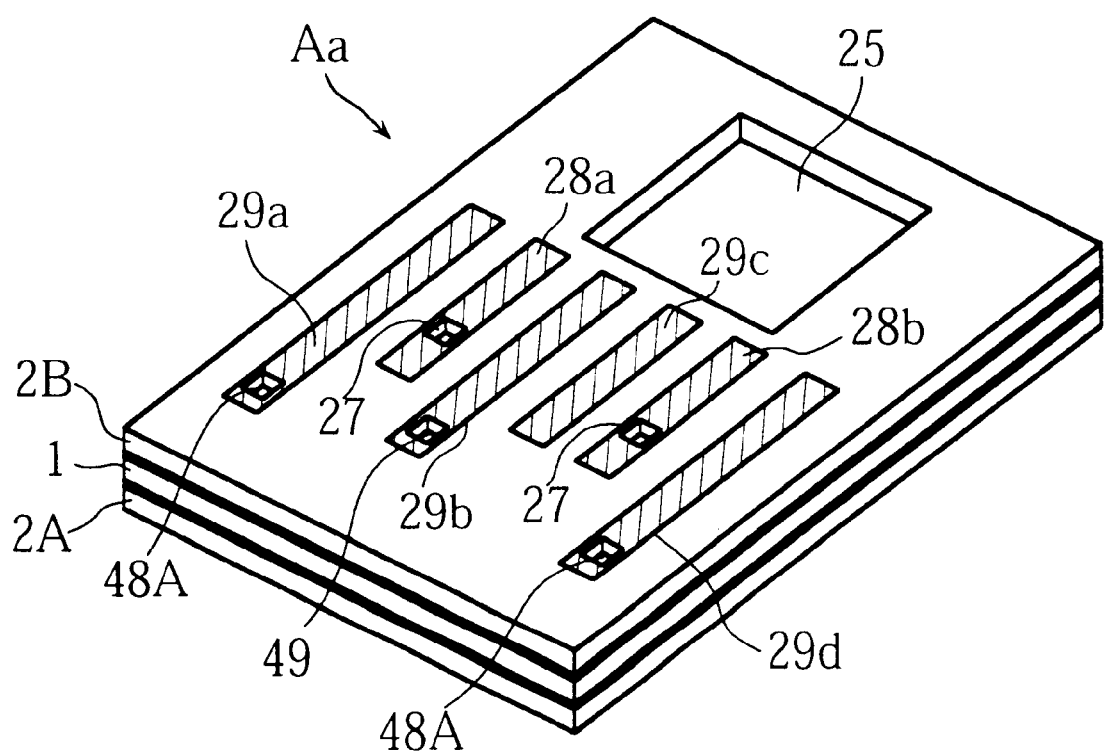
FIG. 19 is a perspective view showing a galvano-mirror according to a second embodiment of the present invention.
Figure 20:
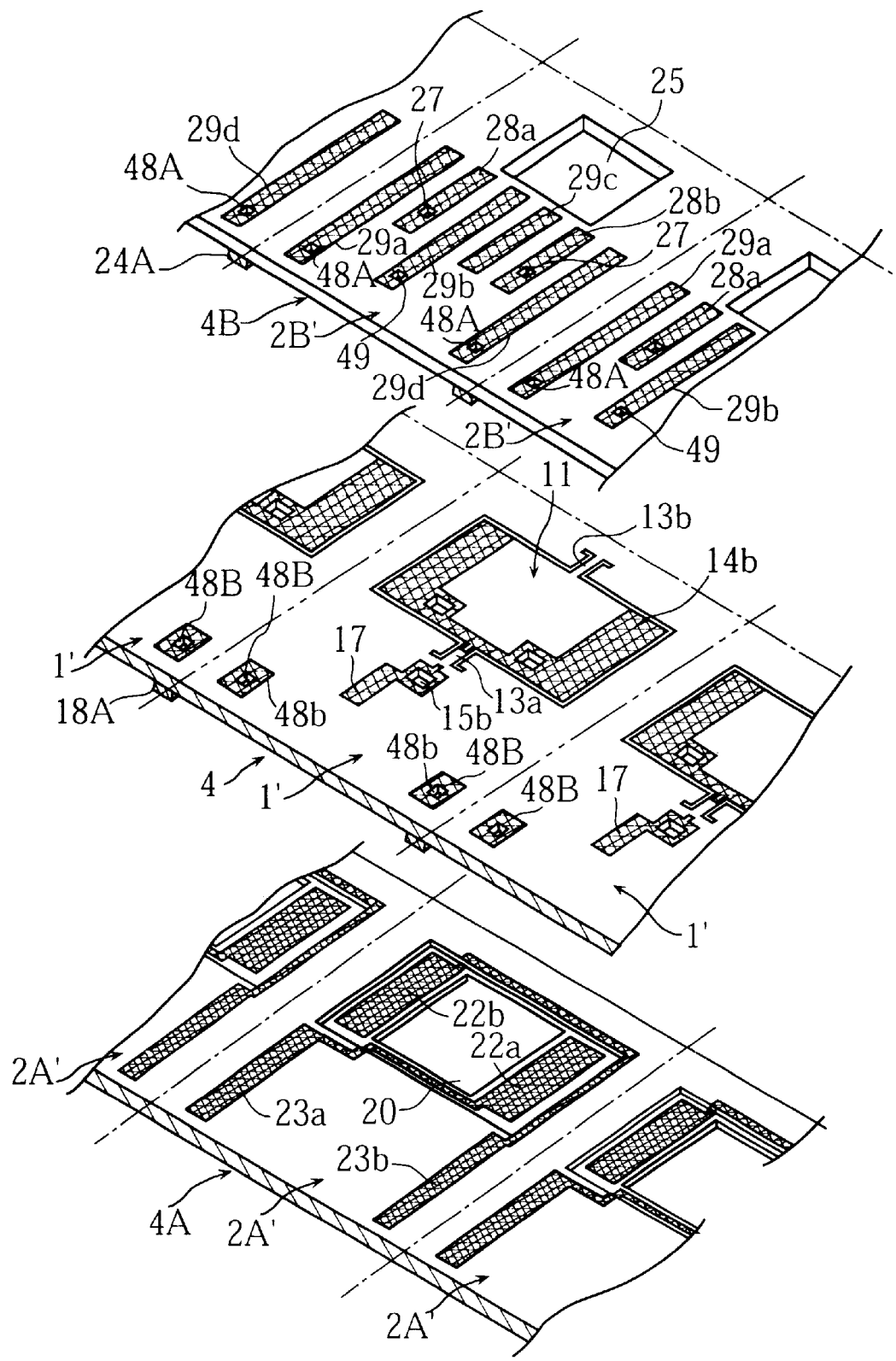
FIGS. 20 and 21A–21B show some steps of the method of making the galvano-mirror of FIG. 19.
Figure 21A:
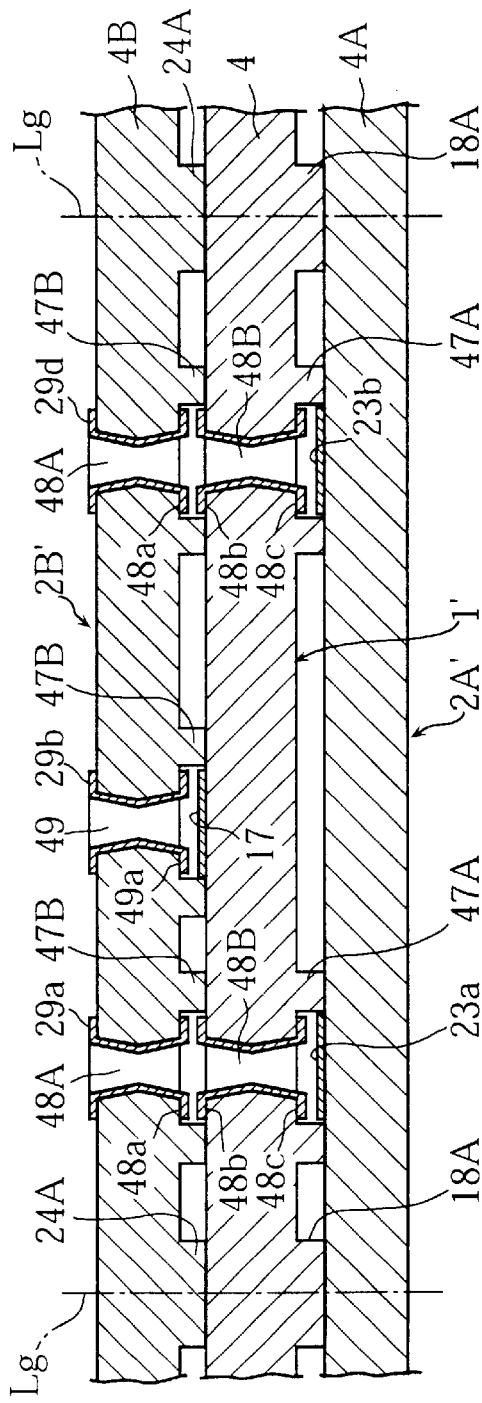
Figure 21B:
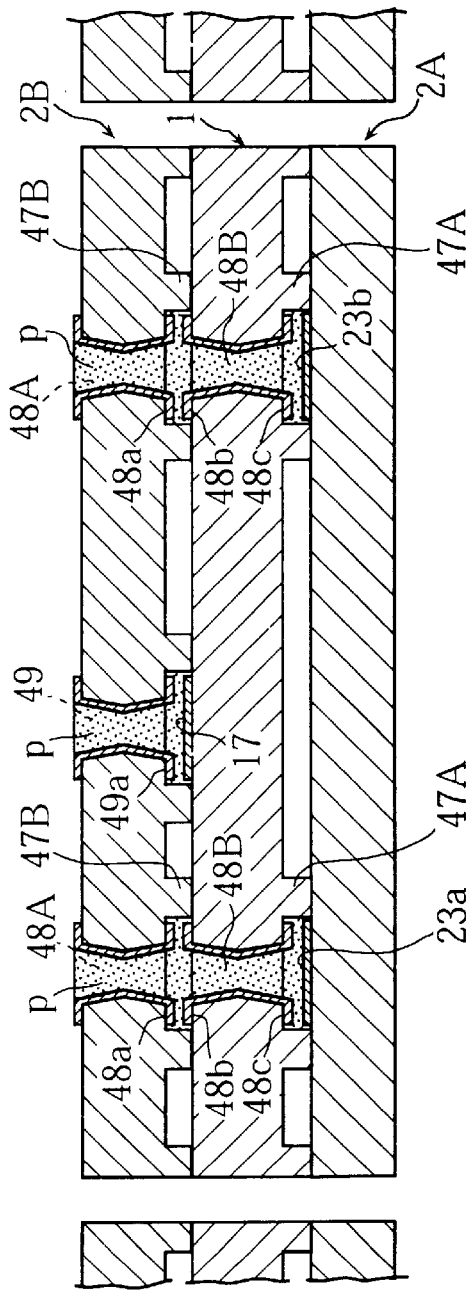

Reference is now made to FIGS. 19, 20 and 21A–21B. FIG. 19 shows a galvano-mirror Aa according to a second embodiment of the present invention, while FIGS. 20 and 21A–21B show some steps of the fabrication procedure for producing the galvano-mirror Aa together with other identical mirrors. As will be seen from the below, the galvano-mirror Aa is basically the same as the above-described galvano-mirror A (compare FIG. 20 and FIG. 17) except for the manner of making an electrical connection between the three wafers.

As shown in FIG. 19, the galvano-mirror Aa includes a mirror plate 1, a first driver plate 2A and a second driver plate 2B. These three plates are equal in length and width. The second driver plate 2B is provided with two terminals 28a–28b and four terminals 29a–29d. The terminals 28a–28b and 29c have a generally equal length. Also, the terminals 29a and 29d have a generally equal length (though they are longer than the terminals 28a–28b and 29c). The terminal 29b is longer than the terminals 28a–28b and 29c, but shorter than the terminals 29a and 29d. Through-holes 27 are formed at the terminals 28a–28b, through-holes 48A are formed at the terminals 29a and 29d, and a through-hole 49 is formed at the terminal 29b. As shown in FIG. 21A, pads 48a and 49a are formed on the inner (or lower, in the figure) surface of the wafer 4B, to be connected to the through-holes 48A and 49.

As shown in FIG. 20, each mirror portion 1' of the wafer 4 is provided with two conductive pads 48b and through-holes 48B connected at one ends to these pads. At the other ends, the through-holes 48B are connected to pads 48c formed on the lower surface of the wafer 4.

The wafer 4 is provided with a plurality of projections 47A to surround the pads 48c. The projections 47A and the ribs 18A have the same height (thickness). Likewise, the wafer 4B is provided with a plurality of projections 47B to surround the pads 48a and 49a. The projections 47B and the ribs 24A have the same height. The projections 47A and 47B may be formed simultaneously with the ribs 18A and 24A, respectively, with the use of the same material and the same fabrication technique.

After the mirror portions 1' and driver portions 2A', 2B' are formed in the relevant wafers, as shown in FIG. 20, the three wafers 4, 4A and 4B are bonded to each other, as shown in FIG. 21A. In this state, the through-holes 48A and 48B are positioned right above the terminals 23a–23b, and the through-holes 49 are positioned right above the terminals 17.

Then, as shown in FIG. 21B, the through-holes 48A–48B and 49 are filled with conductive paste P. Thus, the terminals 23a and 23b are properly connected to the terminal 29a and the terminal 29d, respectively, while the terminal 17 is properly connected to the terminal 29b. It should be appreciated here that the above-mentioned projections 47A and 47B prevent possible leakage of the conductive paste P.

After the filling of the conductive paste P, the wafer assembly is cut along the imaginary lines Lg, as shown in FIG. 21B. The cutting may be performed by reactive ion etching.

Figure 22:
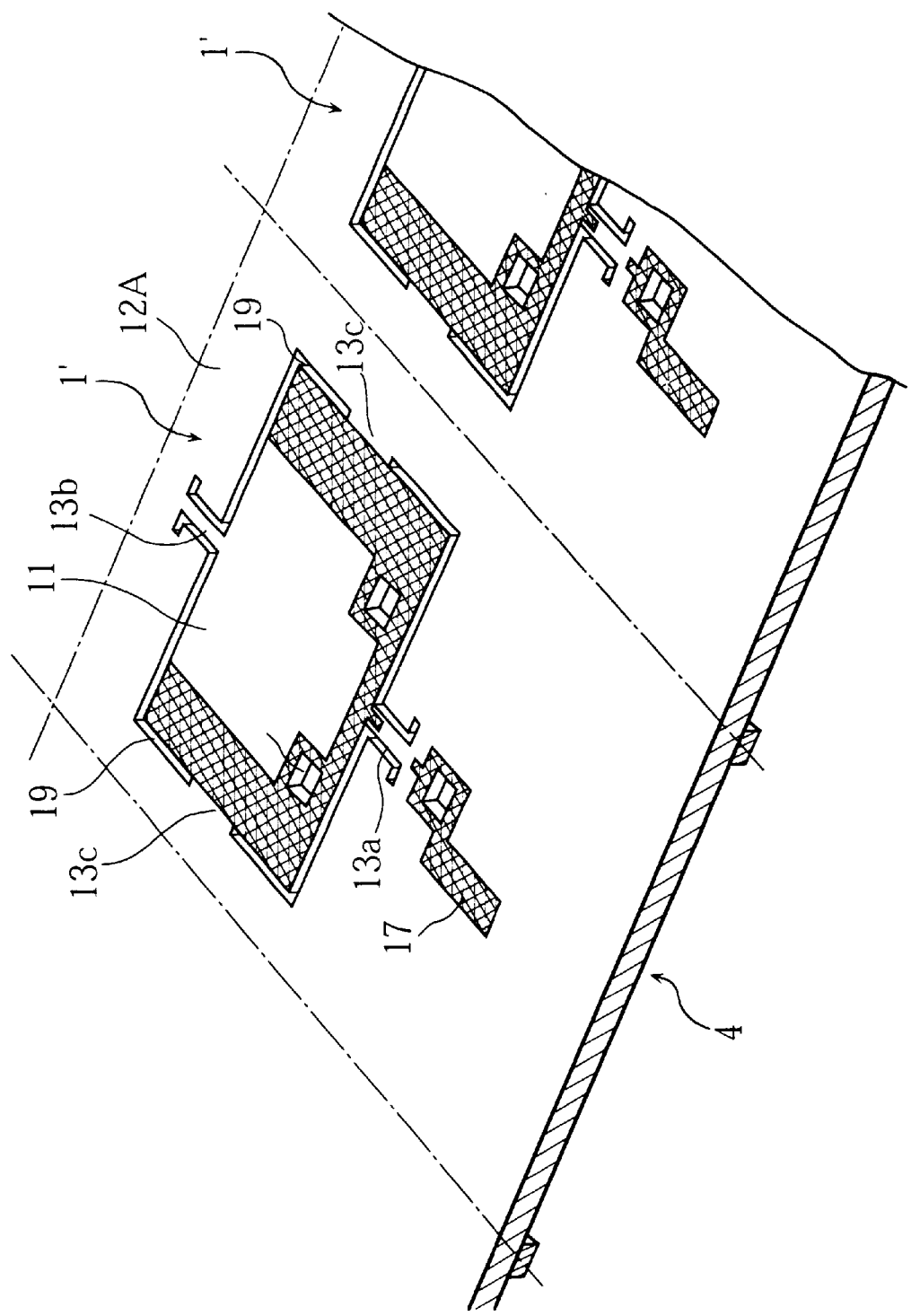
FIG. 22 shows one step of another another fabrication method.

FIG. 22 illustrates one stage of another fabrication method for making galvano-mirrors. In this example, the pivotable member 11 in each mirror portion 1' is connected at four points (two torsion bars 13a, 13b and two additional connecting segments 13C) to the frame portion 12A. The connecting segments 13C are removed by e.g. reactive ion etching at the time of dividing the assembly of the three wafers 4, 4A and 4B into individual pieces. To this end, no oxide films are formed on the respective segments 13C. Under this condition, the connecting segments 13C are exposed through the through-holes 25 of the wafer 4B (see FIG. 17, for example) when the three wafers 4, 4A and 4B are bonded together. Then, the exposed connecting segments 13C are etched away.

In the above manner, the pivotable member 11 in each mirror portion 1' is stably held by the remaining portion 12A until the stacked three wafers are divided into the predetermined pieces. Thus, it is possible to protect the pivotable member 11 (hence the mirror formed thereon) from mechanical damage during the fabrication process.

Figure 23:
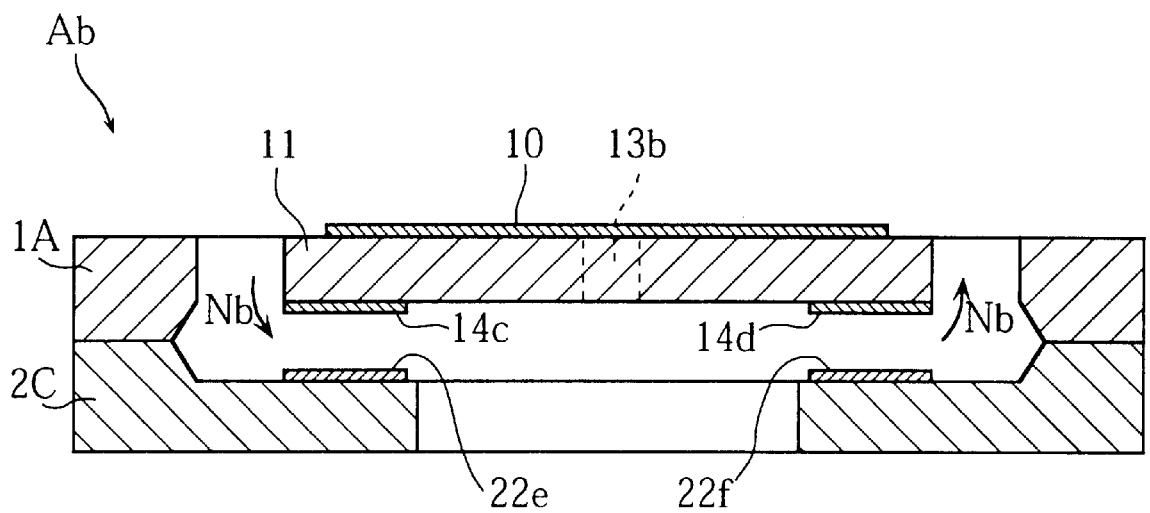
FIGS. 23 and 24 show a galvano-mirror according to a third embodiment of the present invention.
Figure 24:
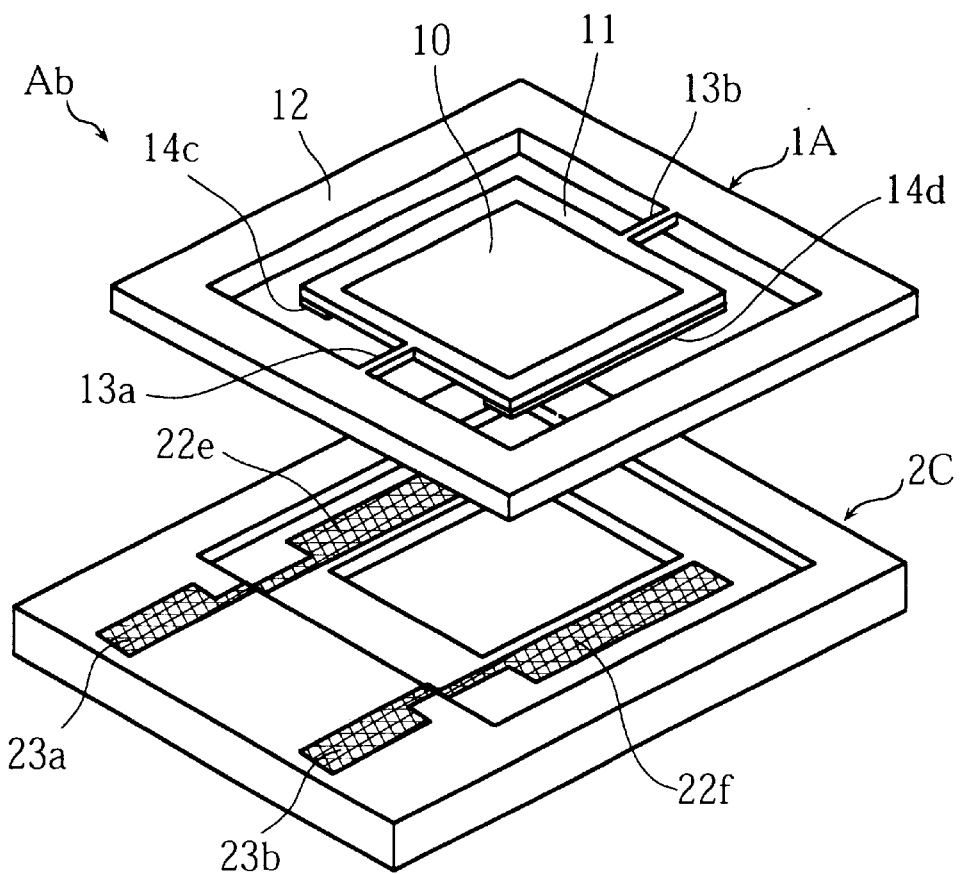
Figure 25A:
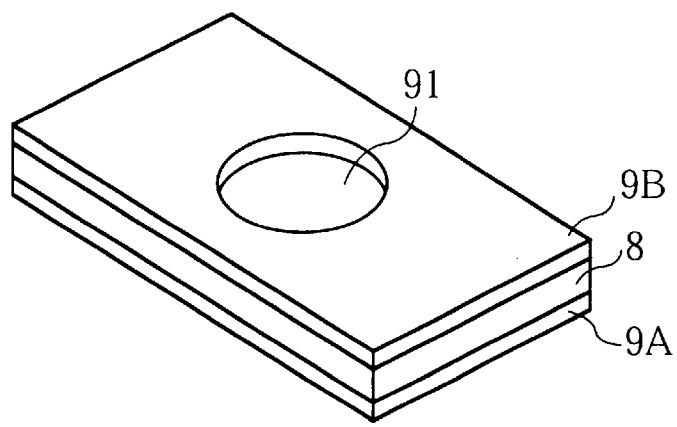
FIGS. 25A–25B show a conventional galvano-mirror.
Figure 25B:
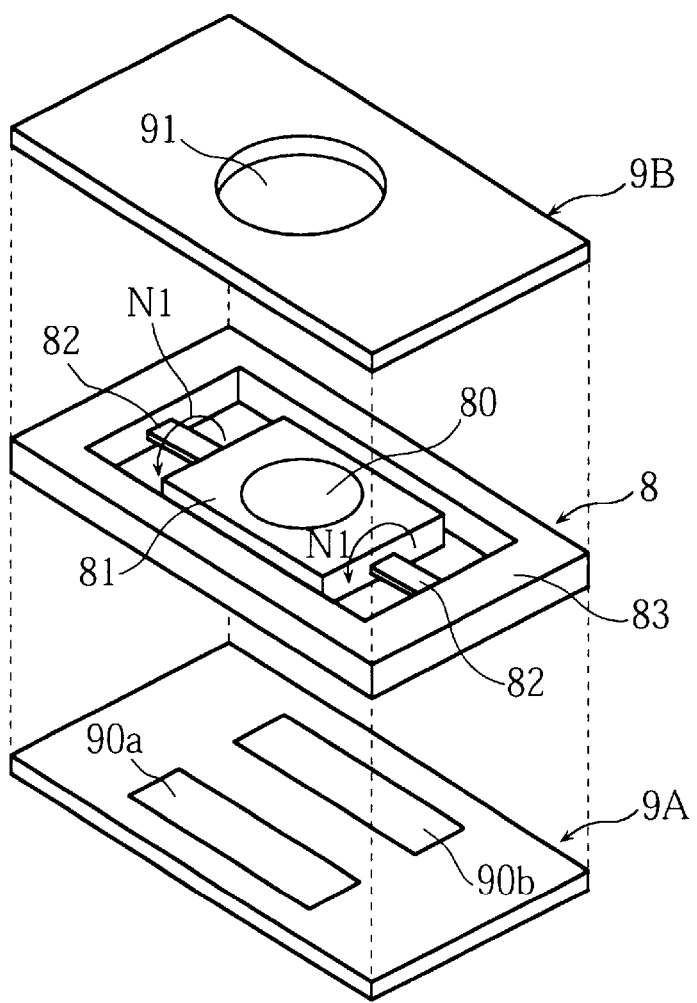

FIGS. 23 and 24 show a galvano-mirror according to a third embodiment of the present invention. The illustrated galvano-mirror Ab is made up of a mirror plate 1A and a driver plate 2C. The pivotable member 11 of the mirror plate 1A has an upper surface provided with a mirror 10, and a lower surface provided with a first pair of electrodes 14c, 14d. Though not illustrated, the mirror plate 1A is provided with terminals for applying a required voltage to the electrodes 14c, 14d. The driver plate 2C is provided with a second pair of electrodes 22e, 22f connected to terminals 23a and 23b, respectively. The electrodes 22e, 22f of the driver plate 2C are arranged in facing relation to the electrodes 14c, 14d of the mirror plate 1A.

In the galvano-mirror Ab, the pivotable member 11 is rotated in the Nb-direction (FIG. 23) when the first electrodes 14c, 14d are charged to a negative potential, while the second electrode 22e is charged to a positive potential. To rotate the pivotable member in the opposite direction, the other second electrode 22f is charged to a positive potential, instead of the second electrode 22e, with keeping the first electrodes 14c, 14d negatively charged. Such a two-plate galvano-mirror is advantageously made by the above-described collective fabrication methods.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A method of making a galvano-mirror provided with a mirror plate and at least one driver plate, the mirror plate including a pivotable member upon which reflecting means and a first electrode are provided, the driver plate including a second electrode facing the first electrode, the method comprising the steps of:

preparing a first material substrate formed with a plurality of mirror plate regions each of which corresponds in arrangement to the mirror plate;

preparing a second material substrate formed with a plurality of driver plate regions each of which corresponds in arrangement to the driver plate;

attaching the first and the second material substrates so that each of the mirror plate regions faces a relevant one of the driver plate regions; and dividing the attached first and second material substrates into individual galvano-mirrors.

2. The method according to claim 1, wherein each of the first and the second material substrates comprises a silicon wafer.

3. The method according to claim 1, further comprising the steps of preparing a third material substrate provided with a plurality of driver plate regions, and positioning the first material substrate between the second and the third material substrates.

4. The method according to claim 1, further comprising the steps of forming ribs on at least either one of the first and the second material substrates, and fixing the first and the second material substrates to each other via the ribs.

5. The method according to claim 4, wherein the ribs are halved at the step of dividing the attached first and second material substrates.

6. The method according to claim 1, wherein each of the mirror plate regions includes a non-etched flat area in which the reflecting means is provided.

7. The method according to claim 1, wherein the dividing of the attached first and second material substrates is performed so that the mirror plate and the driver plate differ in size in each of the individual galvano-mirrors.

8. The method according to claim 1, further comprising the step of forming a terminal connected to the first electrode in each of the mirror plate regions, wherein the dividing of the attached first and second material substrates is performed so that the terminal is partially exposed from the driver plate in each of the individual galvano-mirrors.

9. The method according to claim 8, wherein a predetermined portion of each driver plate region is etched away for the partial exposure of the terminal.

10. The method according to claim 1, further comprising the step of forming a through-hole in at least either one of the first and the second material substrates for electrical connection.

11. The method according to claim 10, further comprising the steps of forming a circular projection adjacent to the through-hole in at least either one of the first and the second material substrates, and filling the through-hole with a conductive material.

12. The method according to claim 11, further comprising the step of forming ribs on at least either one of the first and the second material substrates for separating the substrate regions from each other.

13. The method according to claim 12, wherein the circular projection and the ribs are formed simultaneously by a thin layer forming technique.

14. The method according to claim 1, further comprising the step of forming a stopper to prevent the pivotable member from pivoting in each of the mirror plate regions of the first material substrate, and the step of removing the stopper in dividing the attached first and second material substrates.

15. A galvano-mirror comprising:
a mirror plate provided with a pivotable member upon which reflecting means and a first electrode are provided; and
at least one driver plate provided with a second electrode facing the first electrode;
wherein the mirror plate and the driver plate differ in length from each other.

16. A galvano-mirror comprising:
a mirror plate provided with a pivotable member upon which reflecting means and a first electrode are provided; and
a driver plate having an inner surface facing the mirror plate and an outer surface opposite to the inner surface, the inner surface being provided with a second electrode facing the first electrode, the outer surface being provided with a plurality of external connection terminals;
wherein the driver plate is formed with a plurality of through-holes for connecting each of the first and the second electrodes to a relevant one of the external connection terminals.

* * * * *